(12) United States Patent
Wiatrowski

(10) Patent No.: US 8,851,944 B1
(45) Date of Patent: Oct. 7, 2014

(54) MARINE ENGINE HYDRAULIC SYSTEM

(71) Applicant: BRP US Inc., Sturtevant, WI (US)

(72) Inventor: Darrell Wiatrowski, Libertyville, IL (US)

(73) Assignee: BRP US Inc., Sturtevant, WI (US)

( * ) Notice: Subject to any disclaimer, the term of this patent is extended or adjusted under 35 U.S.C. 154(b) by 104 days.

(21) Appl. No.: 13/721,661

(22) Filed: Dec. 20, 2012

(51) Int. Cl.
*B63H 20/08* (2006.01)
*B63H 5/125* (2006.01)
*F16D 31/02* (2006.01)
*F15B 1/02* (2006.01)

(52) U.S. Cl.
CPC . *B63H 20/08* (2013.01); *F15B 1/02* (2013.01)
USPC ..... 440/61 G; 440/61 T; 440/61 S; 440/61 A; 60/475; 60/476

(58) Field of Classification Search
USPC .... 440/61 G, 61 R, 61 A, 61 S, 61 T; 60/475, 60/476; 91/420
See application file for complete search history.

(56) References Cited

U.S. PATENT DOCUMENTS

| 4,669,494 | A | * | 6/1987 | McBeth | 137/106 |
|---|---|---|---|---|---|
| 4,687,448 | A | | 8/1987 | Peirce | |
| 4,836,810 | A | | 6/1989 | Entringer | |
| 5,030,148 | A | | 7/1991 | Funami et al. | |
| 5,032,094 | A | | 7/1991 | Katogi | |
| 5,178,568 | A | | 1/1993 | Binversie et al. | |
| 5,195,914 | A | | 3/1993 | Binversie et al. | |
| 5,327,812 | A | | 7/1994 | Weyer et al. | |
| 5,746,055 | A | | 5/1998 | Nakamura et al. | |
| 5,924,379 | A | | 7/1999 | Masini et al. | |
| 6,113,444 | A | | 9/2000 | Ritger | |
| 6,146,220 | A | | 11/2000 | Alby et al. | |
| 6,183,321 | B1 | | 2/2001 | Alby et al. | |
| 6,200,175 | B1 | | 3/2001 | Natsume | |
| 6,213,822 | B1 | | 4/2001 | Saito et al. | |
| 6,220,905 | B1 | | 4/2001 | Blanchard | |
| 6,276,976 | B1 | | 8/2001 | Saito | |
| 6,287,160 | B1 | | 9/2001 | Onoue | |
| 6,309,265 | B1 | | 10/2001 | Oguma | |
| 6,325,686 | B1 | | 12/2001 | Funami | |
| 6,416,370 | B1 | | 7/2002 | Bland et al. | |
| 6,454,619 | B1 | | 9/2002 | Funami et al. | |
| 6,824,434 | B2 | | 11/2004 | Kitsu et al. | |
| 7,156,709 | B1 | | 1/2007 | Staerzl et al. | |
| 7,226,326 | B2 | | 6/2007 | Mizuguchi et al. | |
| 7,244,152 | B1 | | 7/2007 | Uppgard | |
| 7,311,571 | B1 | | 12/2007 | Swan et al. | |
| 7,351,125 | B2 | | 4/2008 | Ide et al. | |

(Continued)

*Primary Examiner* — Stephen Avila
*Assistant Examiner* — Anthony Wiest
(74) *Attorney, Agent, or Firm* — BCF LLP

(57) ABSTRACT

A hydraulic system for a marine engine has a fluid reservoir, a bi-directional pump, a valve assembly, and a hydraulic actuator. The valve assembly includes: first and fourth apertures fluidly communicating with the pump, second and third apertures fluidly communicating with the actuator, and a fifth aperture fluidly communicating with the fluid reservoir. Operating the pump to supply hydraulic fluid to the first aperture causes hydraulic fluid to flow from the pump to the actuator and from the actuator to the fluid reservoir, and causes the actuator to move in a first actuator direction. Operating the pump to supply hydraulic fluid to the fourth aperture causes hydraulic fluid to flow from the pump to the actuator and from the actuator to the pump, and causes the actuator to move in a second actuator direction opposite the first actuator direction.

17 Claims, 25 Drawing Sheets

(56) References Cited

U.S. PATENT DOCUMENTS 7,481,688 B2 1/2009 Kobayashi
7,736,206 B1 6/2010 McChesney et al.
2009/0249776 A1* 10/2009 Davidson ................ 60/459

* cited by examiner

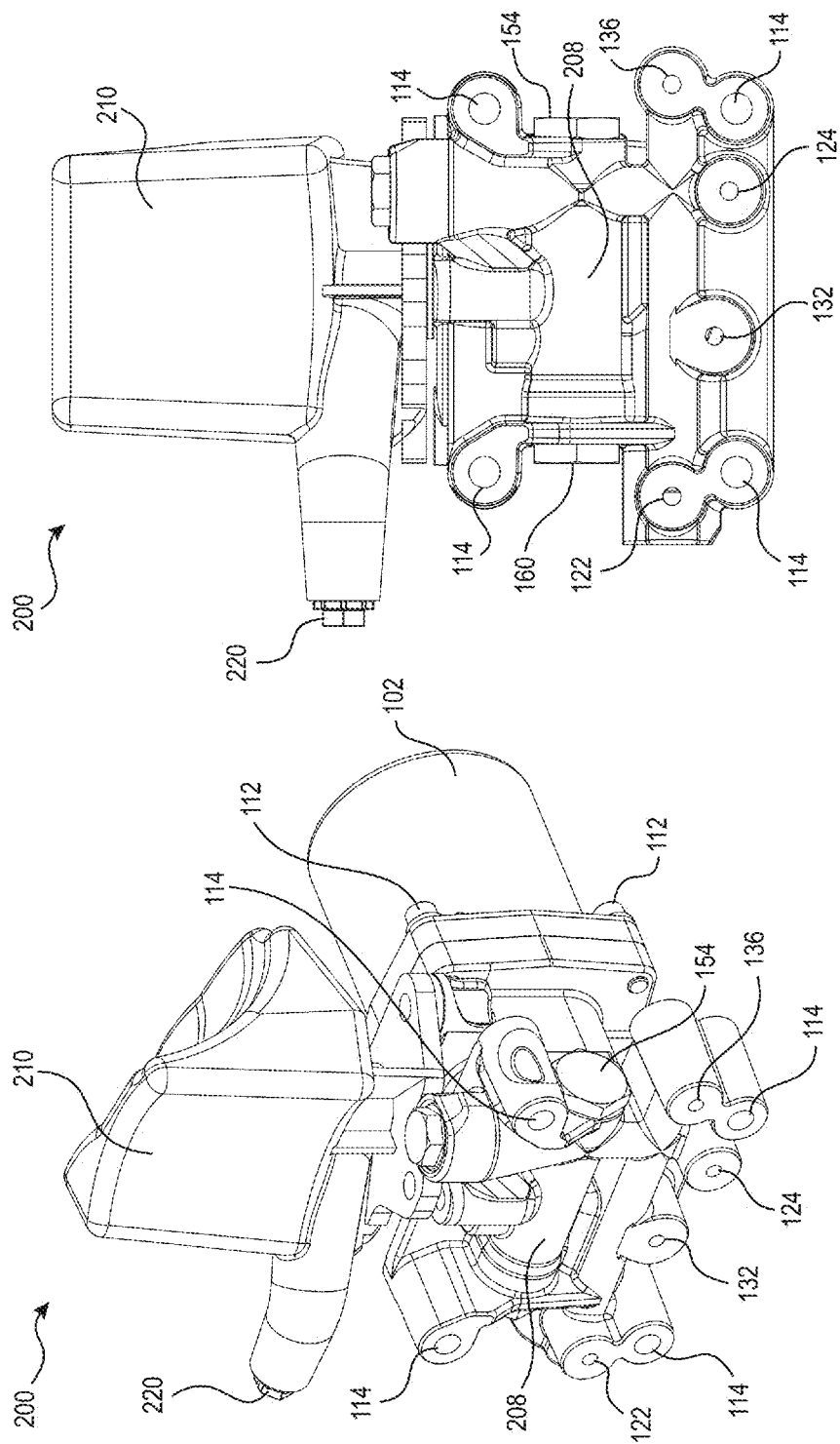

MARINE ENGINE HYDRAULIC SYSTEM

FIELD OF THE INVENTION

The present invention relates to a hydraulic system to tilt, trim and/or steer a marine engine.

BACKGROUND

A marine outboard engine generally comprises a bracket assembly that connects the drive unit of the marine outboard engine to the transom of a boat. The drive unit includes the internal combustion engine and propeller. The marine outboard engine is typically designed so that the steering angle and the tilt/trim angles of the drive unit relative to the boat can be adjusted and modified as desired. The bracket assembly typically includes a swivel bracket carrying the drive unit for pivotal movement about a steering axis and a stern bracket supporting the swivel bracket and the drive unit for pivotal movement about a tilt axis extending generally horizontally. The stern bracket is connected to the transom of the boat.

Some marine outboard engines are provided with a hydraulic linear actuator connected between the stern and swivel brackets for pivoting the swivel bracket to lift the lower portion of the outboard engine above the water level or, conversely, lower the lower portion of the outboard engine below the water level. Some marine outboard engines are also provided with a distinct hydraulic linear actuator for pivoting the swivel bracket through a smaller range of angles and at slower rate of motion to trim the outboard engine while the lower portion thereof is being submerged. Some marine outboard engines are also provided with a hydraulic linear actuator connected between the swivel bracket and the drive unit for pivoting the drive unit about the steering axis in order to steer the boat.

In order to operate the one or more hydraulic actuators, hydraulic fluid needs to be supplied to the actuators. This requires one or more pumps, hydraulic fluid reservoirs, and multiple valves and hoses.

Hydraulic actuators such as the hydraulic linear actuators described above are referred to herein as "unbalanced" actuators. A linear actuator has an actuator body inside of which a piston is slidably disposed. A piston rod extends from one side of the piston and passes through an end of the actuator body. Pumping hydraulic fluid on the side of the piston that does not have the rod causes the piston and the piston rod to move such that the rod extends further out of the actuator body. Pumping hydraulic fluid on the side of the piston having the rod causes the piston and the piston rod to move in the opposite direction such that the rod is retracted inside the actuator body. Due to the presence of the piston rod on only one side of the piston, less hydraulic fluid is required to retract the piston rod by one unit of length than to extend the piston rod by one unit of length. Hence the name unbalanced actuator.

Therefore, when pumping fluid in the actuator body on the side of the piston that does not have the piston rod, the volume of hydraulic fluid being pushed out of the actuator body on the other side of the piston is not sufficient to replace the volume of hydraulic fluid being pumped into the actuator body and the pump has to draw additional hydraulic fluid from the hydraulic fluid reservoir to make up the difference. Conversely, when pumping fluid in the actuator body on the side of the piston that has the piston rod, the volume of hydraulic fluid being pushed out of the actuator body on the other side of the piston is greater than the volume of hydraulic fluid needed to push the piston and the excess hydraulic fluid is returned to the fluid reservoir.

This exchange of hydraulic fluid with the reservoir has the advantage of purging air that might be trapped in the hydraulic fluid as it is circulated to and from the actuator. Air trapped in the hydraulic fluid is separated from the hydraulic fluid as it sits in the fluid reservoir and hydraulic fluid that is drawn from the fluid reservoir is substantially free of trapped air.

Other hydraulic actuators, such as some rotary actuators and linear actuators having pistons rods of equal diameters on each side of the piston, are referred to herein as "balanced" actuators because the same or substantially the same amount of hydraulic fluid is required to move them by one dimensional unit in one direction or the other. As such the pump takes hydraulic fluid from one side of the actuator and returns it to the other side of the actuator. In other words, the volumetric flow rate of hydraulic fluid into the actuator is the same as the volumetric flow rate of hydraulic fluid out of the actuator. Therefore, there is no or very little exchange of hydraulic fluid with the fluid reservoir and balanced actuators do not benefit from the air purging feature that inherently occurs with unbalanced actuator.

Therefore there is a need for a hydraulic system for a marine engine having a balanced actuator that provides air purging of the hydraulic fluid.

SUMMARY

It is an object of the present invention to ameliorate at least some of the inconveniences present in the prior art.

In one aspect, a hydraulic system for a marine engine has a fluid reservoir for containing hydraulic fluid, a bi-directional pump fluidly connected to the fluid reservoir, a valve assembly fluidly connected to the pump and the fluid reservoir, and a hydraulic actuator fluidly connected to the valve assembly. The hydraulic actuator selectively fluidly communicates with the pump and the fluid reservoir via the valve assembly. The hydraulic actuator is adapted for moving an engine of the marine engine about one of a tilt/trim axis and a steering axis. The valve assembly includes: a first aperture fluidly communicating with the pump, a second aperture fluidly communicating with the actuator, a third aperture fluidly communicating with the actuator, a fourth aperture fluidly communicating with the pump, and a fifth aperture fluidly communicating with the fluid reservoir. Operating the pump to supply hydraulic fluid to the first aperture causes hydraulic fluid to flow from the pump to the actuator via the first and second apertures and from the actuator to the fluid reservoir via the third and fifth apertures, and causes the actuator to move in a first actuator direction. Operating the pump to supply hydraulic fluid to the fourth aperture causes hydraulic fluid to flow from the pump to the actuator via the fourth and third apertures and from the actuator to the pump via the second and first apertures, and causes the actuator to move in a second actuator direction opposite the first actuator direction.

In a further aspect, operating the pump to supply hydraulic fluid to the first aperture prevents hydraulic fluid flow between the valve assembly and the pump via the fourth aperture. Operating the pump to supply hydraulic fluid to the fourth aperture prevents hydraulic fluid flow between the valve assembly and the fluid reservoir via the fifth aperture.

In an additional aspect, interrupting operation of the pump causes the valve assembly to prevent fluid communication between the actuator and the pump and between the actuator and the fluid reservoir.

In a further aspect, operating the pump to supply hydraulic fluid to the first aperture causes the pump to draw hydraulic fluid from the fluid reservoir and to supply the hydraulic fluid to the first aperture. Operating the pump to supply hydraulic fluid to the fourth aperture causes the pump to draw hydraulic fluid from the actuator via the second and first apertures and to supply this hydraulic fluid to the fourth aperture.

In an additional aspect, the valve assembly is a shuttle type spool valve.

In a further aspect, the valve assembly further includes: a body, the first, second, third, fourth and fifth apertures being defined in the body, a first valve port, the first aperture fluidly communicating with the second aperture via the first valve port, a first valve body normally biased to close the first valve port, a second valve port, the third aperture fluidly communicating with the fourth aperture via the second valve port, a second valve body normally biased to close the second valve port, a shuttle disposed in the body of the valve assembly between the first and second valve ports, the shuttle defining a passage selectively fluidly communicating with the fifth aperture, a first variable volume chamber defined in the body of the valve assembly between the shuttle and the first valve port, and a second variable volume chamber defined in the body of the valve assembly between the shuttle and the second valve port.

In an additional aspect, operating the pump to supply hydraulic fluid to the first aperture: moves the first valve body to open the first valve port, causes hydraulic fluid to flow sequentially from the pump to the first aperture, the first variable volume chamber, the first valve port, the second aperture and in the actuator, causes hydraulic fluid in the first variable volume chamber to push the shuttle against the second valve body to open the second valve port, to close the fourth aperture and to fluidly communicate the passage of the shuttle with the fifth aperture, and causes hydraulic fluid to flow sequentially from the actuator to the third aperture, the second valve port, the passage in the shuttle, the fifth aperture and the fluid reservoir. Operating the pump to supply hydraulic fluid to the fourth aperture: moves the second valve body to open the second valve port, causes hydraulic fluid to flow sequentially from the pump to the fourth aperture, the second variable volume chamber, the second valve port, the third aperture and in the actuator, causes hydraulic fluid in the second variable volume chamber to push the shuttle against the first valve body to open the first valve port, and to close the fifth aperture to prevent fluid communication between the passage of the shuttle and the fifth aperture, and causes hydraulic fluid to flow sequentially from the actuator to the second aperture, the first valve port, the first variable volume chamber, the first aperture and the pump.

In a further aspect, the hydraulic actuator is a rotary actuator. The rotary actuator includes: a cylindrical main body having a first end and a second end, a central shaft disposed inside the main body, a piston surrounding the central shaft and disposed inside the main body, the piston being slidable along the central shaft, sliding of the piston along the central shaft causing rotation of the central shaft relative to the cylindrical main body, a first variable volume actuator chamber defined in the main body between the first end and a first side of the piston, a first actuator passage defined in the main body between the first end and a first side of the piston, the first actuator passage fluidly communicating the first variable volume actuator chamber with the second aperture, a second variable volume actuator chamber defined in the main body between the second end and a second side of the piston, and a second actuator passage defined in the main body between the second end and a second side of the piston, the second actuator passage fluidly communicating the second variable volume actuator chamber with the third aperture.

In an additional aspect, the rotary actuator further includes a third actuator passage defined in the main body between the first and second actuator passage. The third actuator passage is disposed closer to the second actuator passage than to the first actuator passage. The third actuator passage fluidly communicates the second variable volume actuator chamber with the fluid reservoir over a first range of piston positions. The third actuator passage fluidly communicates the first variable volume chamber with the fluid reservoir over a second range of piston positions. The second range of piston positions includes piston positions disposed between piston positions in the first range of piston positions and the second end. The first range of piston positions is a greater range than the second range of piston positions.

In another aspect, a marine outboard engine for a watercraft has a stern bracket for mounting the marine outboard engine to the watercraft, a swivel bracket pivotally connected to the stern bracket about a generally horizontal tilt/trim axis, a drive unit pivotally connected to the swivel bracket about a steering axis, the steering axis being generally perpendicular to the tilt/trim axis, and a hydraulic system according to one or more of the above aspects. The hydraulic actuator is operatively connected to at least one of the stern bracket and the swivel bracket for pivoting the drive unit relative to the stern bracket about one of the tilt/trim axis and the steering axis.

In a further aspect, the hydraulic actuator is operatively connected to the stern bracket and the swivel bracket for pivoting the drive unit relative to the stern bracket about the tilt/trim axis. The first actuator direction is a tilt up direction and the second actuator direction is a tilt down direction.

For purposes of this application, the terms related to spatial orientation such as forward, rearward, left, right, vertical, and horizontal are as they would normally be understood by a driver of a boat sitting thereon in a normal driving position with a marine outboard engine mounted to a transom of the boat. Also, the term "to prevent", and variations thereof (i.e. prevents, preventing . . . ), mean to stop or impede. For example, a valve preventing fluid communication between two chambers could stop fluid from going from one chamber to the other (i.e. the valve provides a perfect seal between the chambers) or could impede the flow of fluid from one chamber to the other (i.e. the valve leaks slightly).

Embodiments of the present invention each have at least one of the above-mentioned aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 21 is a perspective view taken from a rear, right side of the hydraulic unit of FIG. 20; and FIG. 22 is a rear elevation view of the hydraulic unit of FIG. 20;

It will be appreciated that some conventional components, such as O-rings, seals, bearings and the like have been omitted from the figures for clarity.

DETAILED DESCRIPTION

The present invention will be described with respect to a marine outboard engine. However, it is contemplated that aspects of the present invention could be used with other marine engines, such as, for example, a stern drive.

Figure 1:
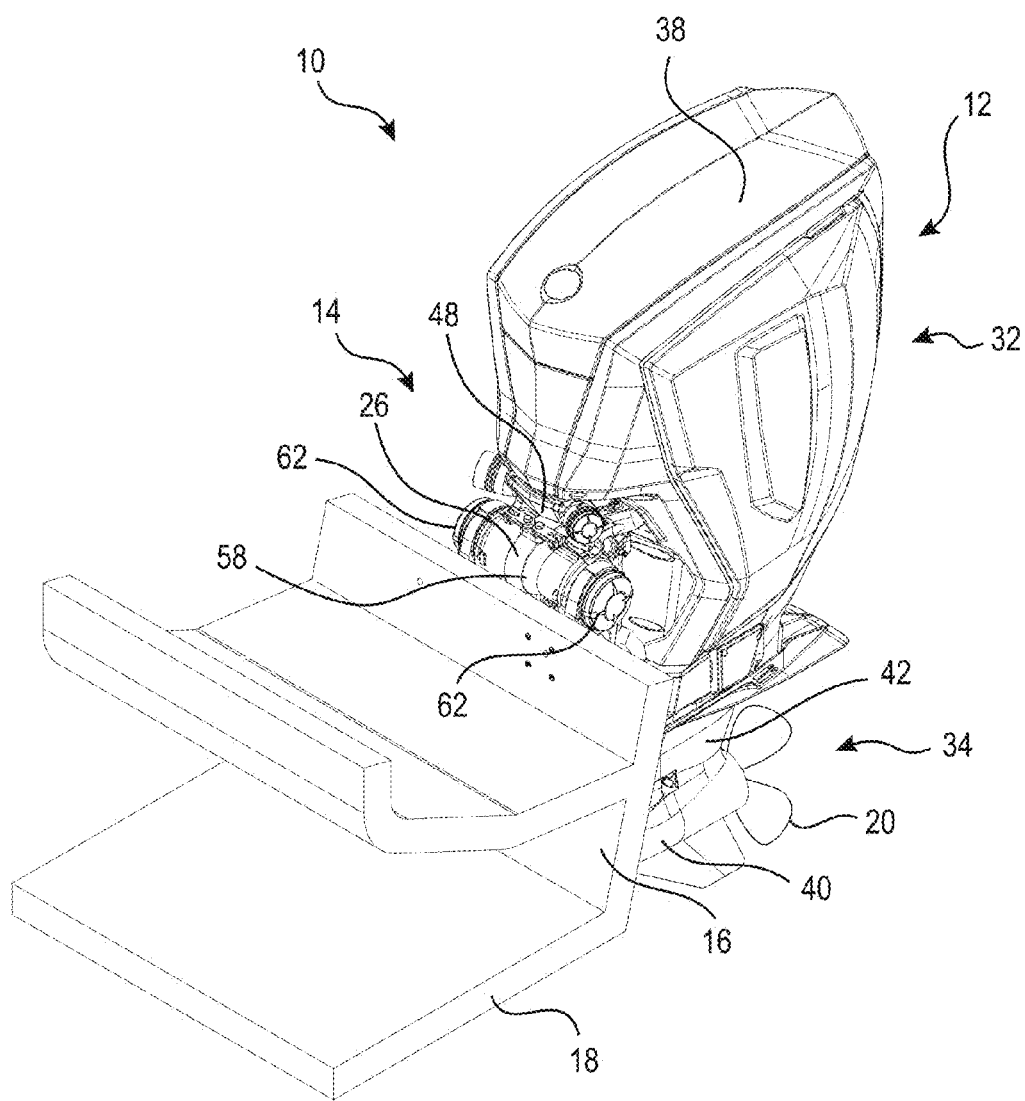
FIG. 1 is a perspective view taken from a front, left side of a marine outboard engine mounted in an upright position to a transom of watercraft.
Figure 2:
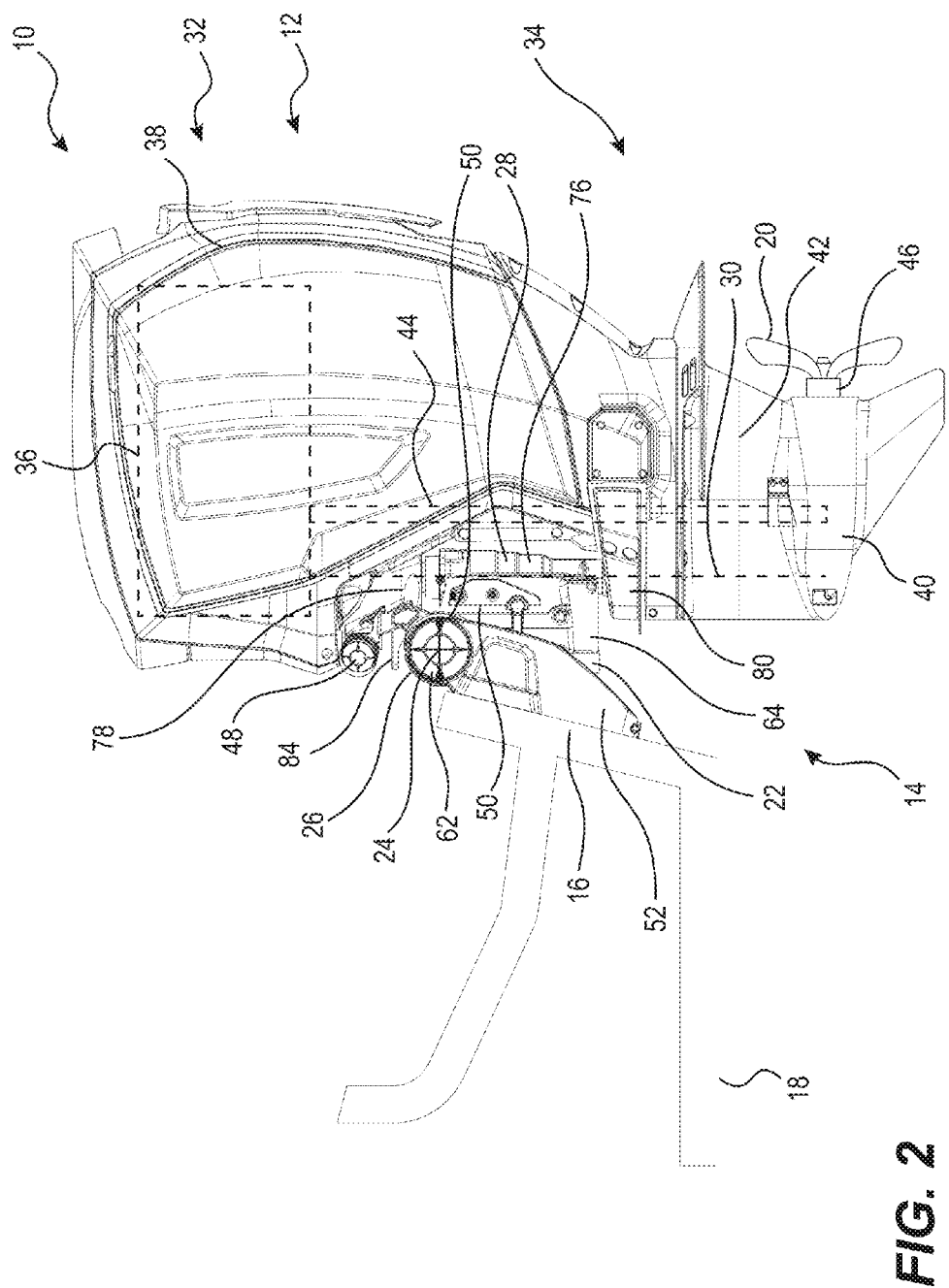
FIG. 2 is a left side elevation view of the outboard engine of FIG. 1.
Figure 3:
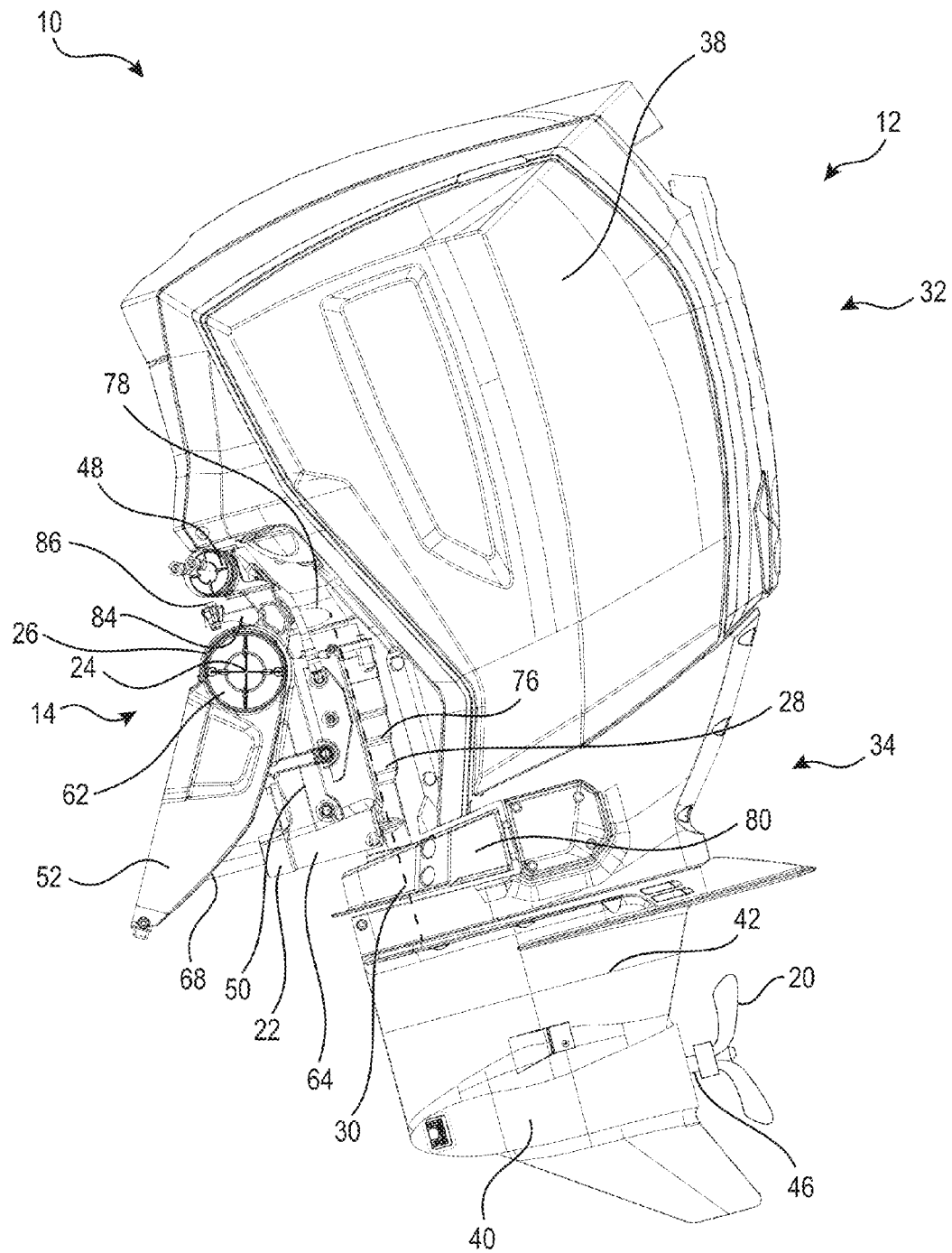
FIG. 3 is a left side elevation view of the outboard engine of FIG. 1 in a trim up position.
Figure 6:
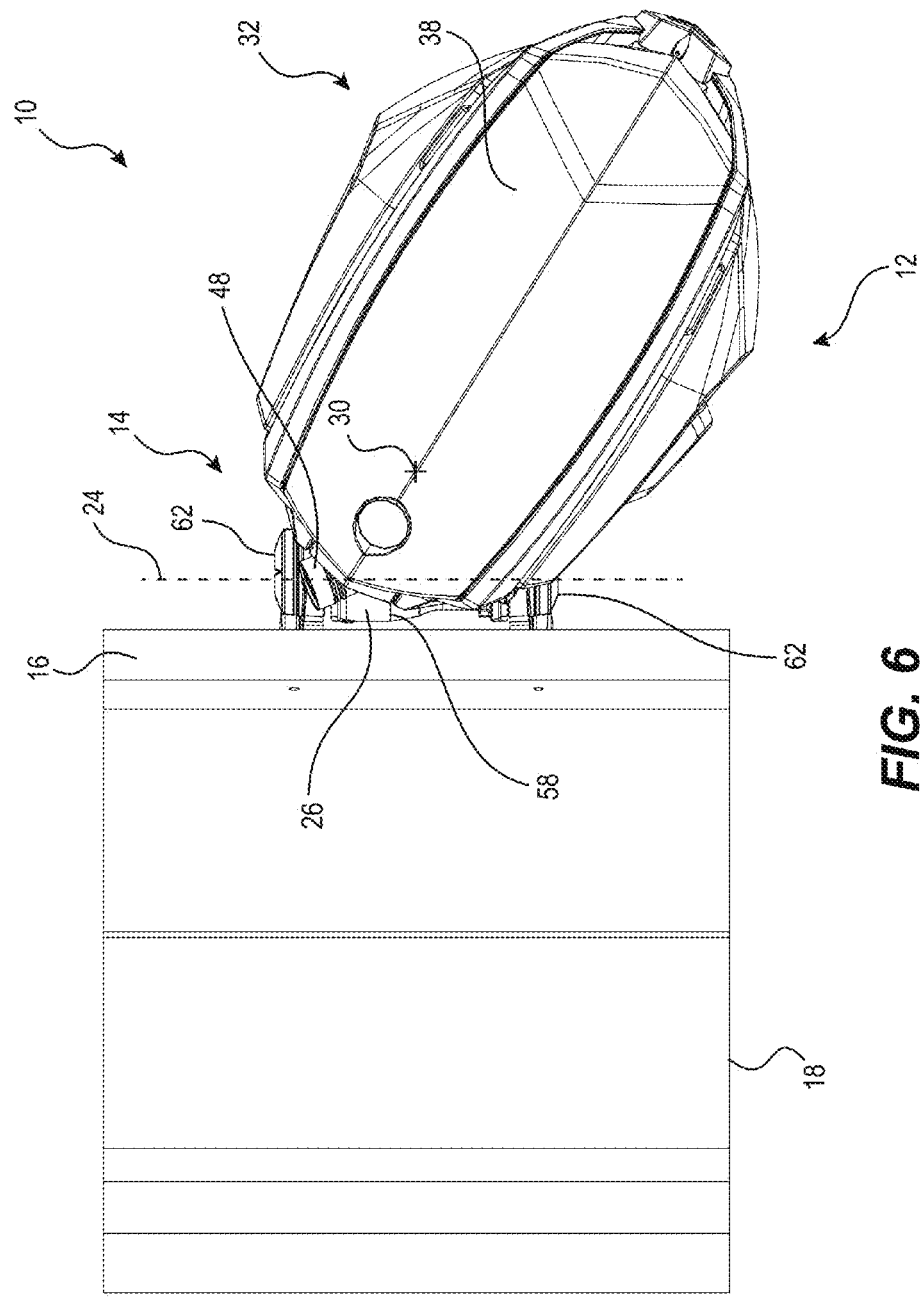
FIG. 6 is a top plan view of the outboard engine of FIG. 1 steered to make a left turn.

With reference to FIGS. 1 and 2, a marine outboard engine 10, shown in the upright position, includes a drive unit 12 and a bracket assembly 14. The bracket assembly 14 supports the drive unit 12 on a transom 16 of a hull 18 of an associated watercraft (not shown) such that a propeller 20 is in a submerged position with the watercraft resting relative to a surface of a body of water. The drive unit 12 can be trimmed up (see FIG. 3) or down relative to the hull 18 by linear actuators 22 of the bracket assembly 14 about a tilt/trim axis 24 extending generally horizontally. The drive unit 12 can also be tilted up (see FIG. 4) or down relative to the hull 18 by a rotary actuator 26 of the bracket assembly 14 about the tilt/trim axis 24. The drive unit 12 can also be steered left (see FIG. 6) or right relative to the hull 18 by another rotary actuator 28 of the bracket assembly 14 about a steering axis 30. The steering axis 30 extends generally perpendicularly to the tilt/trim axis 24. When the drive unit 12 is in the upright position as shown in FIGS. 1 and 2, the steering axis 30 extends generally vertically. The actuators 22, 26 and 28 are hydraulic actuators. The actuators 22, 26 and 28 and their operation will be discussed in greater detail below.

The drive unit 12 includes an upper portion 32 and a lower portion 34. The upper portion 32 includes an engine 36 (schematically shown in dotted lines in FIG. 2) surrounded and protected by a cowling 38. The engine 36 housed within the cowling 38 is an internal combustion engine, such as a two-stroke or four-stroke engine, having cylinders extending horizontally. It is contemplated that other types of engine could be used and that the cylinders could be oriented differently. The lower portion 34 includes the gear case assembly 40, which includes the propeller 20, and the skeg portion 42, which extends from the upper portion 32 to the gear case assembly 40.

The engine 36 is coupled to a driveshaft 44 (schematically shown in dotted lines in FIG. 2). When the drive unit 12 is in the upright position as shown in FIG. 2, the driveshaft 44 is oriented vertically. It is contemplated that the driveshaft 44 could be oriented differently relative to the engine 34. The driveshaft 44 is coupled to a drive mechanism (not shown), which includes a transmission (not shown) and the propeller 20 mounted on a propeller shaft 46. In FIG. 2, the propeller shaft 46 is perpendicular to the driveshaft 44, however it is contemplated that it could be at other angles. The driveshaft 44 and the drive mechanism transfer the power of the engine 36 to the propeller 20 mounted on the rear side of the gear case assembly 40 of the drive unit 12. It is contemplated that the propulsion system of the outboard engine 10 could alternatively include a jet propulsion device, turbine or other known propelling device. It is further contemplated that the bladed rotor could alternatively be an impeller.

To facilitate the installation of the outboard engine 10 on the watercraft, the outboard engine 10 is provided with a box 48. The box 48 is connected on top of the rotary actuator 26.

As a result, the box 48 pivots about the tilt/trim axis 24 when the outboard engine 10 is tilted, but does not pivot about the steering axis 30 when the outboard engine 10 is steered. It is contemplated that the box 48 could be mounted elsewhere on the bracket assembly 14 or on the drive unit 12. Devices located inside the cowling 38 which need to be connected to other devices disposed externally of the outboard engine 10, such as on the deck or hull 18 of the watercraft, are provided with lines which extend inside the box 48. In one embodiment, these lines are installed in and routed to the box 48 by the manufacturer of the outboard engine 10 during manufacturing of the outboard engine 10. Similarly, the corresponding devices disposed externally of the outboard engine 10 are also provided with lines that extend inside the box 48 where they are connected with their corresponding lines from the outboard engine 10. It is contemplated that one or more lines could be connected between one or more devices located inside the cowling 38 to one or more devices located externally of the outboard engine 10 and simply pass through the box 48. In such an embodiment, the box 48 would reduce movement of the one or more lines when the outboard engine 10 is steered, tilted or trimmed.

Other known components of an engine assembly are included within the cowling 38, such as a starter motor, an alternator and the exhaust system. As it is believed that these components would be readily recognized by one of ordinary skill in the art, further explanation and description of these components will not be provided herein.

Turning now to FIGS. 7 to 17, the bracket assembly 14 will be described in more detail. The bracket assembly 14 includes a swivel bracket 50 pivotally connected to a stern bracket 52 via the rotary actuator 26. The stern bracket 52 includes a plurality of holes 54 and slots 56 adapted to receive fasteners (not shown) used to fasten the bracket assembly 14 to the transom 16 of the watercraft. By providing many holes 54 and slots 56, the vertical position of the stern bracket 53, and therefore the bracket assembly 14, relative to the transom 16 can be adjusted.

The rotary actuator 26 includes a cylindrical main body 58, a central shaft (not shown) disposed inside the main body 58 and protruding from the ends thereof, and a piston (not shown) surrounding the central shaft and disposed inside the main body 58. The main body 58 is located at an upper end of the swivel bracket 50 and is integrally formed therewith. It is contemplated that the main body 58 could be fastened, welded, or otherwise connected to the swivel bracket 50. The central shaft is coaxial with the tilt/trim axis 24. Splined disks 60 (FIG. 9) are provided over the portions of the central shaft that protrude from the main body 58. The splined disks 60 are connected to the central shaft so as to be rotationally fixed relative to the central shaft. The stern bracket 52 has splined openings at the upper end thereof that receive the splined disks 60 therein. As a result, the stern bracket 52, the splined disks 60 and the central shaft are all rotationally fixed relative to each other. Anchoring end portions 62 are fastened to the sides of the stern bracket 52 over the splined openings thereof and the ends of the central shaft, thus preventing lateral displacement of the swivel bracket 50 relative to the stern bracket 52.

The piston is engaged to the central shaft via oblique spline teeth on the central shaft and matching splines on the inside diameter of the piston. The piston is slidably engaged to the inside wall of the cylindrical main body 58 via longitudinal splined teeth on the outer diameter of the piston and matching splines on the inside diameter of the main body 58. By applying pressure on the piston, by supplying hydraulic fluid inside the main body 58 on one side of the piston, the piston slides along the central shaft. Since the central shaft is rotationally fixed relative to the stern bracket 52, the oblique spline teeth cause the piston, and therefore the main body 58 (due to the longitudinal spline teeth), to pivot about the central shaft and the tilt/trim axis 24. The connection between the main body 58 and the swivel bracket 50 causes the swivel bracket 50 to pivot about the tilt/trim axis 24 together with the main body 58. Supplying hydraulic fluid to one side of the piston causes the swivel bracket 50 to pivot away from the stern bracket 52 (i.e. tilt up). Supplying hydraulic fluid to the other side of the piston causes the swivel bracket 50 to pivot toward the stern bracket 52 (i.e. tilt down). In the present embodiment, supplying hydraulic fluid to the left side of the piston causes the swivel bracket 50 to tilt up and supplying hydraulic fluid to the ride side of the piston causes the swivel bracket 50 to tilt down.

U.S. Pat. No. 7,736,206 B1, issued Jun. 15, 2010, the entirety of which is incorporated herein by reference, provides additional details regarding rotary actuators similar in construction to the rotary actuator 26.

To maintain the swivel bracket 50 in a half-tilt position (i.e. a position intermediate the positions shown in FIGS. 2 and 4), which is a position of the swivel bracket 50 typically used when the watercraft is in storage or on a trailer, the bracket assembly 14 is provided with a locking arm 63 pivotally connected to the swivel bracket 50. To use the locking arm 63, the swivel bracket 50 is tilted up slightly past the half-tilt position, the locking arm 63 is pivoted to its locking position, and the swivel bracket 50 is tilted down to the half-tilt position where the locking arm 63 makes contact with the stern bracket 52. The locking arm 63 thus alleviates stress on the rotary actuator 26 and its associated hydraulic components during storage or transport on a trailer.

Figure 9:
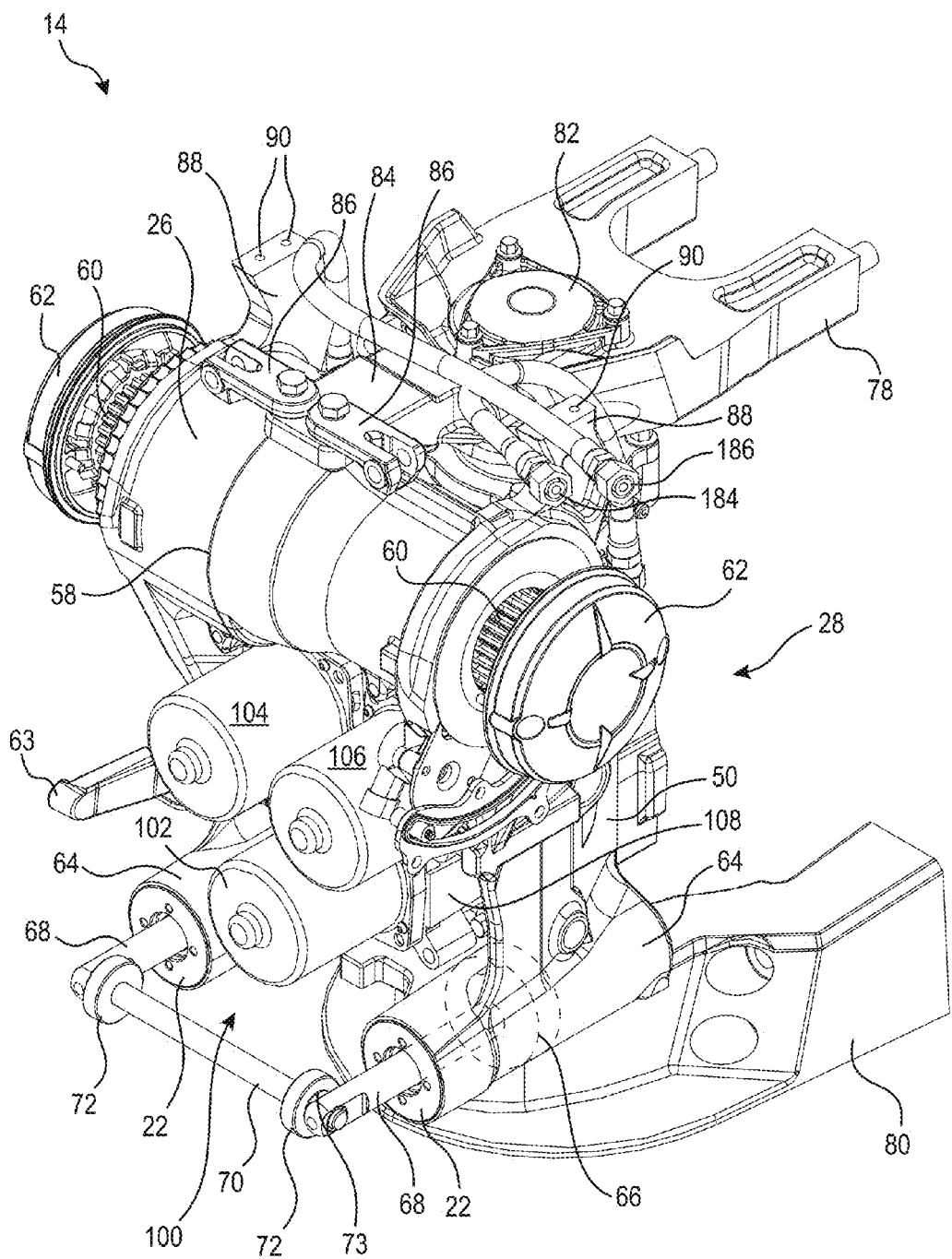
FIG. 9 is a perspective view taken from a front, left side of the bracket assembly of FIG. 7 with the stern bracket removed.

As best seen in FIG. 9, the linear actuators 22 each include a cylinder 64, a piston 66 (only the left piston 66 is shown in dotted lines in FIG. 9) disposed inside the cylinder 64, and a rod 68 connected to the piston 66 and protruding from the cylinder 64. As can be seen, the cylinders 64 are located at a lower end of the swivel bracket 50. The cylinders 64 are integrally formed with the swivel bracket 50 and the lines which supply them with hydraulic fluid are formed thereby, as will be discussed in further detail below. It is contemplated that the cylinders 64 could alternatively be fastened, welded, or otherwise connected to the swivel bracket 50. The rods 68 extend generally perpendicularly to the tilt/trim axis 24 and to the steering axis 30. It is contemplated that the hydraulic linear actuators 22 could be replaced by other types of linear actuators having a fixed portion connected to the swivel bracket 50 and a movable portion being extendable and retractable linearly relative to the fixed portion.

Figure 10:
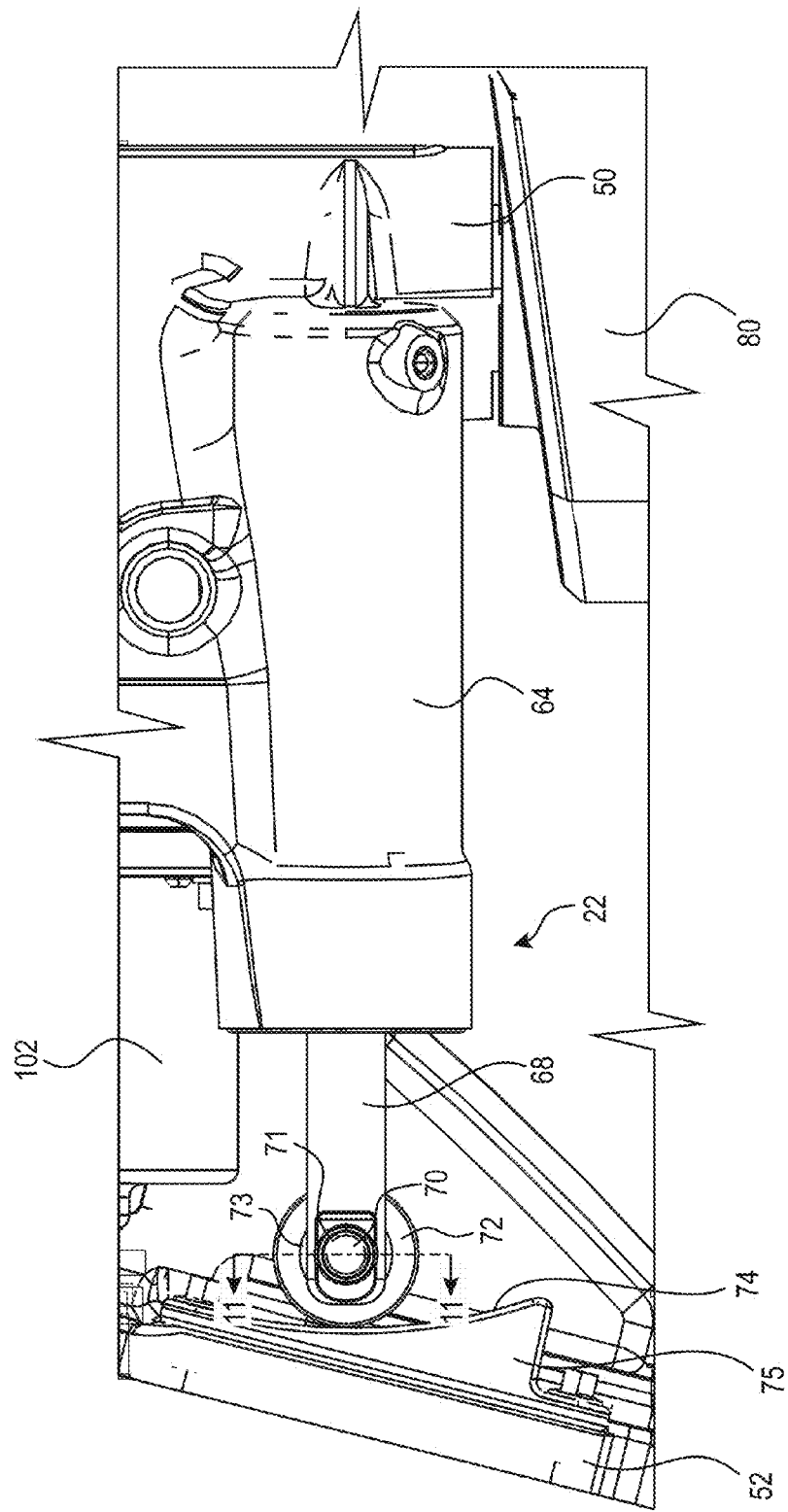
FIG. 10 is a close-up, left side elevation view of a left linear actuator and a corresponding ramp of the bracket assembly of FIG. 7
Figure 11:
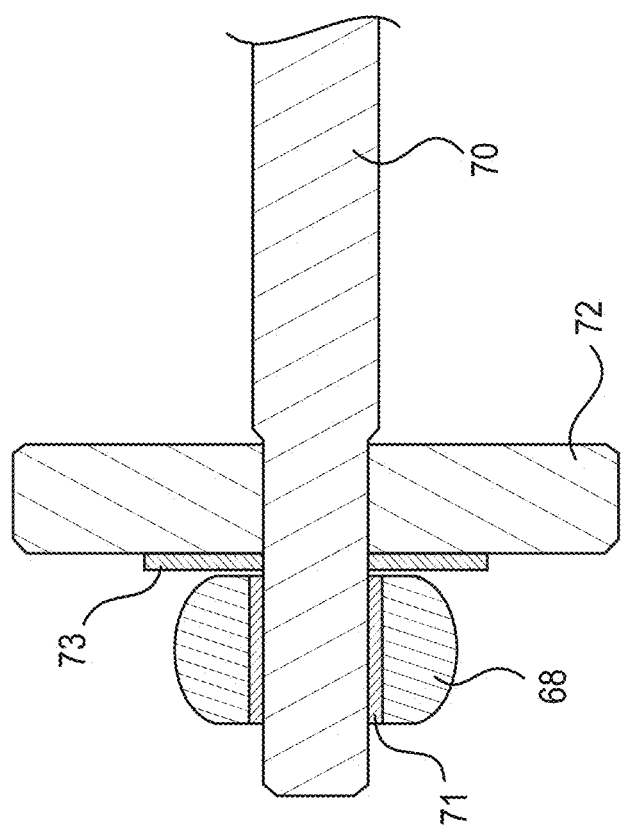
FIG. 11 is a cross-sectional view of the end of the linear actuator of FIG. 10 taken through line 11-11 of FIG. 10.

A shaft 70 with rollers 72 thereon extends from one rod 68 to the other. The rollers 72 are made of stainless steel, but other materials, such as plastics, are contemplated. As best seen in FIGS. 9 to 11, the ends of the shaft 70 are inserted inside apertures in the end portions of the rods 68. A bushing 71 is inserted inside each aperture between each end of the shaft 70 and its corresponding rod 68 as can be seen in FIG. 11 for the left end of the rod. The bushings 71 act as journal bearings to allow the rod 70 to rotate inside the apertures of the rods 68. It is contemplated that the bushings 71 could be replaced by bearings, such as ball bearings for example. It is also contemplated that the bushings 71 could be omitted. The rollers 72 are press-fit onto the shaft 70. As a result, both rollers 72 and the shaft 70 rotate together. It is contemplated that the rollers 72 could be rotationally fixed to the shaft 70 by other types of connections. For example, the rollers 72 could be welded, fastened or splined onto the shaft 70. In an alternative embodiment, the shaft 70 is rotationally fixed relative to the rods 68 by being welded, fastened or otherwise connected thereto, and the rollers 72 are rotationally mounted onto the shaft 70 with bearings or bushings for example. As can be seen, the rollers 72 are disposed laterally inwardly of the rods 68. In other words, the left roller 72 is disposed to the right of the left rod 68 and the right roller 72 is disposed to the left of the right rod 68. It is contemplated that the rollers 72 could be disposed laterally outwardly of the rods 68. It is also contemplated that the ends of the rods 68 could be forked and that the rollers 72 could be received in the forked ends of the rods 68. As can be seen in FIG. 11 for the left end portion of the shaft 70, in the present embodiment, the diameter of the shaft 70 where each roller 72 is press-fit is smaller than the diameter of the central portion of the shaft 70 and is greater than the diameter of the ends of the shaft 70. It is contemplated that the shaft 70 could have a uniform diameter. It is also contemplated that the shaft 70 could have diameters different from the ones illustrated. For example, the diameter of the shaft 70 where each roller 72 is press-fit could be the greatest diameter of the shaft 70. Each roller 72 is disposed in proximity to its corresponding rod 68 to reduce lateral movement of the rod 70. A washer 73 is disposed on the shaft 70 between each roller 72 and the side of its corresponding rod 68.

Figure 4:
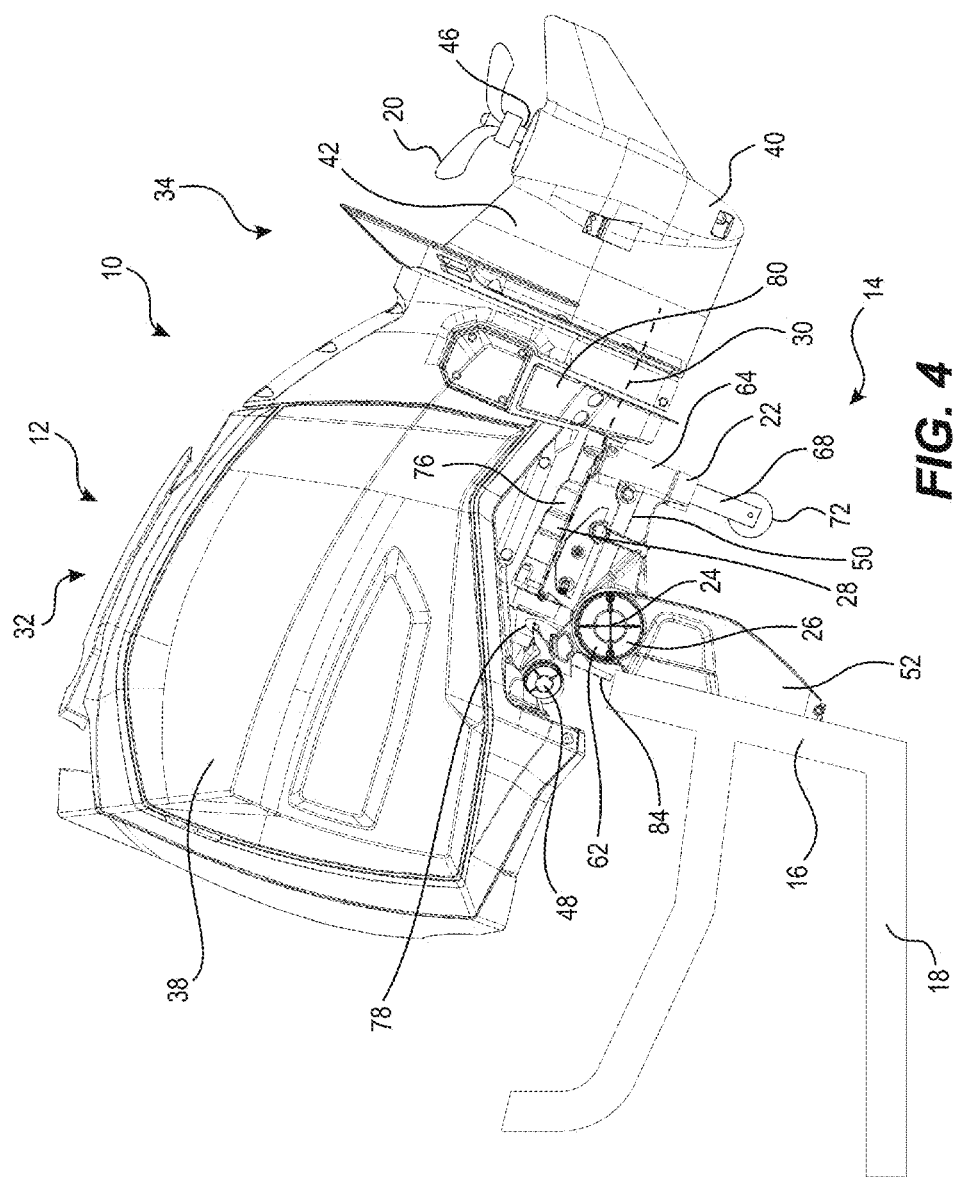
FIG. 4 is a left side elevation view of the outboard engine of FIG. 1 in a tilt up position.
Figure 5:
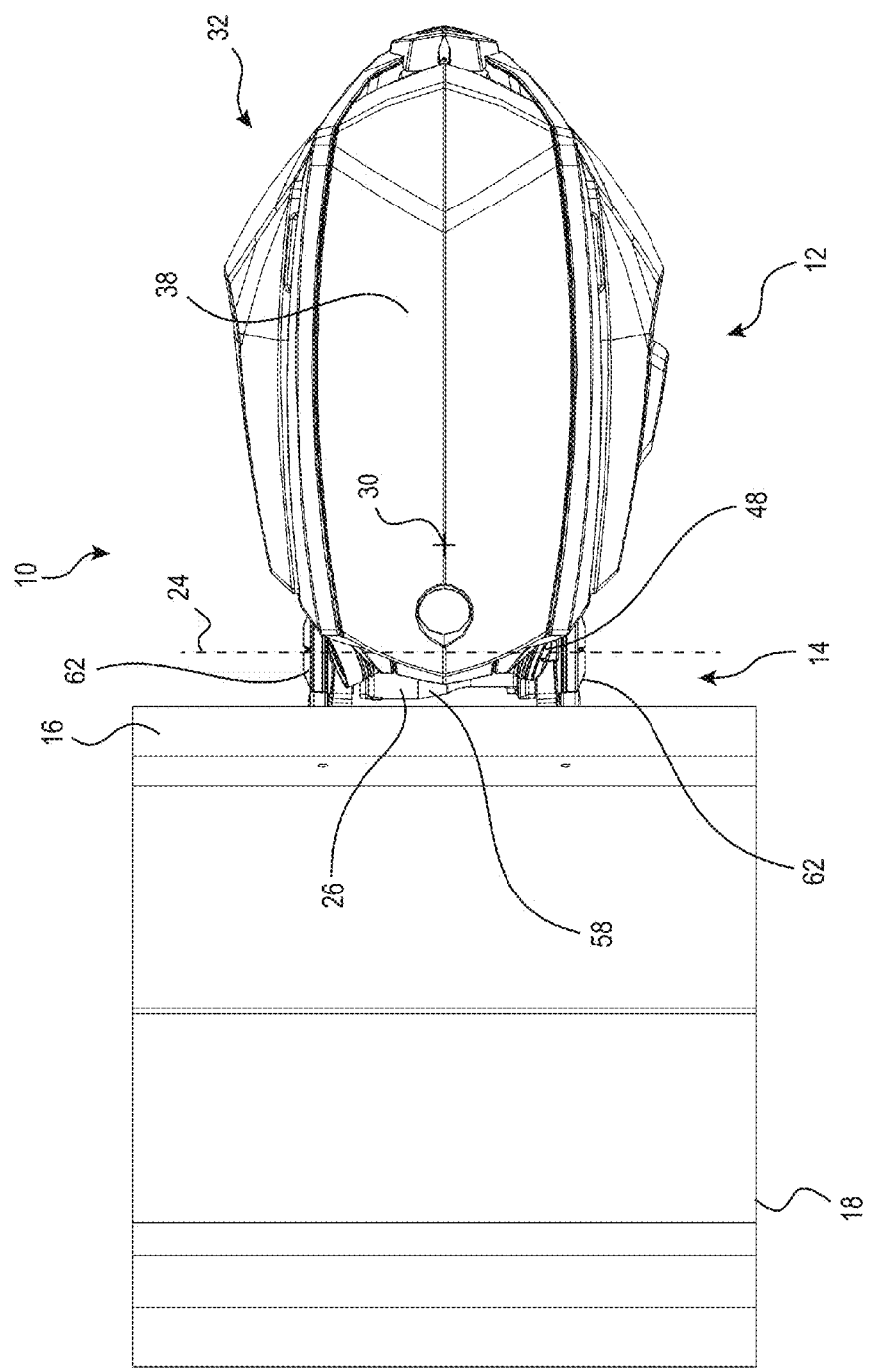
FIG. 5 is a top plan view of the outboard engine of FIG. 1 steered in a straight ahead direction.

By supplying hydraulic fluid inside the cylinders 64 on the side of the pistons 66 opposite the side from which the rods 68 extend, the pistons 66 slide inside the cylinders 64. This causes the rods 68 to extend further from the cylinders 64 and the rollers 72 to roll along and push against the curved surfaces 74 formed by the ramps 75 connected to the stern bracket 52. The shaft 70 helps maintain the rollers 72 in alignment with each other. It is also contemplated that the alignment of the rollers 72 could be maintained in another manner. For example, it is contemplated that the complementary shapes of the pistons 66 and the cylinders 64, or alternatively of the rods 68 and the cylinders 66, could maintain the alignment of the rollers 72. The ramps 75 are fastened to the back of the stern bracket 52. It is contemplated that the ramps 75 could be welded to the stern bracket 52, integrally formed with the stern bracket 52, or otherwise connected to the stern bracket 52. As the rods 68 extend from their respective cylinders 64, the rollers 72 roll down along the curved surfaces 74. As the rollers 72 roll down along the curved surfaces 74, they move away from the stern bracket 52 due to the profile of the surfaces 74. As a result of the rods 68 extending from the cylinders 64 and the rollers 72 rolling along the surfaces 74, the swivel bracket 50 pivots away from the stern bracket 52 (i.e. trims up) about the tilt/trim axis 24 up to the angle shown in FIG. 3 where the rods 68 are fully extended. The profile of the curved surfaces 74 determines the speed at which the swivel bracket 50 pivots about the tilt/trim axis 24 (trim speed) for a given amount of extension of the rods 68. In one embodiment, the profile of the curved surfaces 74 is selected such that the rods 68 remain perpendicular to their corresponding surfaces 74 at the points of contact at all times. This can reduce side loading on the rods 68 during operation. In addition, such a curved surface 74 ensures that the trim speed remains constant for a constant rate of extension of the rods 68. In other words, each inch of travel of the rods 68 results in the same amount of rotation of the swivel bracket 50 pivots about the tilt/trim axis 24 throughout the stroke. In another embodiment, the profile of the curved surfaces 74 is selected such that the trim speed increases as the rods 68 extend for a constant rate of extension of the rods 68, thus providing a smoother transition in angular speed from trim to tilt. In one exemplary embodiment, the curved surfaces 74 each define an arc have a center of curvature disposed generally at a center of a surface of their corresponding pistons 66 facing away from the stern bracket 52. It is contemplated that the curved surfaces 74 could be replaced with straight surfaces angled relative to the surface to which the ramps 75 connect of the stern bracket 52. In one exemplary embodiment, the swivel bracket 50 pivots by 22 degrees from its lowest position (i.e. the upright position shown in FIG. 2) to the highest trim position shown in FIG. 3. It is contemplated that this angle could be between 15 and 30 degrees. Once this angle is reached, should further pivoting of the swivel bracket 50 relative to the stern bracket 52 (i.e. tilt) be desired, the rotary actuator 26 provides the pivoting motion up to the angle shown in FIG. 4. As can be seen in FIG. 4, the rollers 72 no longer make contact with the stern bracket 52. To pivot the swivel bracket 50 back toward the stern bracket 52 (i.e. trim down) about the tilt/trim axis 24 from the position shown in FIG. 3, the hydraulic fluid can be actively removed from the cylinders 64 (i.e. pumped out), or can be pushed out of the cylinders 64 by the pistons 66 due to the weight of the swivel bracket 50 and the drive unit 12 pushing toward the stern bracket 52. The movement achieved by the linear actuators 22 is known as trim as they allow for precise angular adjustment of the swivel bracket 50 relative to the stern bracket 52 at a slower angular speed than that provided by the rotary actuator 26.

Similarly to the rotary actuator 26, the rotary actuator 28 includes a cylindrical main body 76, a central shaft (not shown) disposed inside the main body 76 and protruding from the ends thereof and a piston (not shown) surrounding the central shaft and disposed inside the main body 76. The main body 76 is centrally located along the swivel bracket 50 and is integrally formed therewith. It is contemplated that the main body 76 could be fastened, welded, or otherwise connected to the swivel bracket 50. The central shaft is coaxial with the steering axis 30. Splined disks (not shown) are provided over the portions of the central shaft that protrude from the main body 76. The splined disks are connected to the central shaft so as to be rotationally fixed relative to the central shaft. An upper generally U-shaped drive unit mounting bracket 78 has a splined opening therein that receives the upper splined disk therein. Similarly, a lower generally U-shaped drive unit mounting bracket 80 has a splined opening therein that receives the lower splined disk therein. The upper and lower drive unit mounting brackets 78, 80 are fastened to the drive unit 12 so as to support the drive unit 12 onto the bracket assembly 14. As a result, the drive unit 12, the splined disks and the central shaft are all rotationally fixed relative to each other. Anchoring end portions 82 (only the upper one of which is shown) are fastened to the upper and lower drive unit mounting brackets 78, 80 over the splined openings thereof and the ends of the central shaft, thus preventing displacement of the drive unit 12 along the steering axis 30.

The piston is engaged to the central shaft via oblique spline teeth on the central shaft and matching splines on the inside diameter of the piston. The piston is slidably engaged to the inside wall of the cylindrical main body 76 via longitudinal splined teeth on the outer diameter of the piston and matching splines on the inside diameter of the main body 76. By applying pressure on the piston, by supplying hydraulic fluid inside the main body 76 on one side of the piston, the piston slides along the central shaft. Since the main body 76 is rotationally fixed relative to the swivel bracket 50, the oblique spline teeth cause the central shaft and therefore the upper and lower drive unit mounting bracket 78, 80, to pivot about the steering axis 30. The connections between the drive unit 12 and the upper and lower drive unit mounting brackets 78, 80 cause the drive unit 12 to pivot about the steering axis 30 together with the central shaft. Supplying hydraulic fluid to one side of the piston causes the drive unit 12 to steer left. Supplying hydraulic fluid to the other side of the piston causes the drive unit 12 to steer right. In the present embodiment, supplying hydraulic fluid above the piston causes the drive unit 12 to steer left and supplying hydraulic fluid below the piston causes the drive unit 12 to steer right.

U.S. Pat. No. 7,736,206 B1, issued Jun. 15, 2010, provides additional details regarding rotary actuators similar in construction to the rotary actuator 28.

The upper drive unit mounting bracket 78 has a forwardly extending arm 84. Two linkages 86 are pivotally fastened to the top of the arm 84. When more than one marine outboard engine is provided on the transom 16 of the watercraft, one or both of the linkages 86, depending on the position and number of marine outboard engines, of the marine outboard engine 10 are connected to rods which are connected at their other ends to corresponding linkages on the other marine outboard engines. Accordingly, when the marine outboard engine 10 is steered, the linkages 86 and rods cause the other marine outboard engines to be steered together with the marine outboard engine 10.

Two arms 88 extend from the upper end of the swivel bracket 50. As can be seen in FIG. 9, these arms 88 are provided with threaded apertures 90. These apertures 90 are used to fasten the box 48 to the swivel bracket 50 such that the box 48 pivots about the tilt/trim axis 24 together with the swivel bracket 50.

To supply hydraulic fluid to the rotary actuators 26, 28 and the linear actuators 22, the bracket assembly 14 is provided with a hydraulic unit 100. As best seen in FIG. 9, the hydraulic unit 100 is mounted to the swivel bracket 50 so as to pivot together with the swivel bracket 50 about the tilt-trim axis 24. It is contemplated that in some alternative embodiments of the present bracket assembly 14, that the hydraulic unit 100 or some elements thereof could be mounted to the stern bracket 52 instead.

Figure 12:
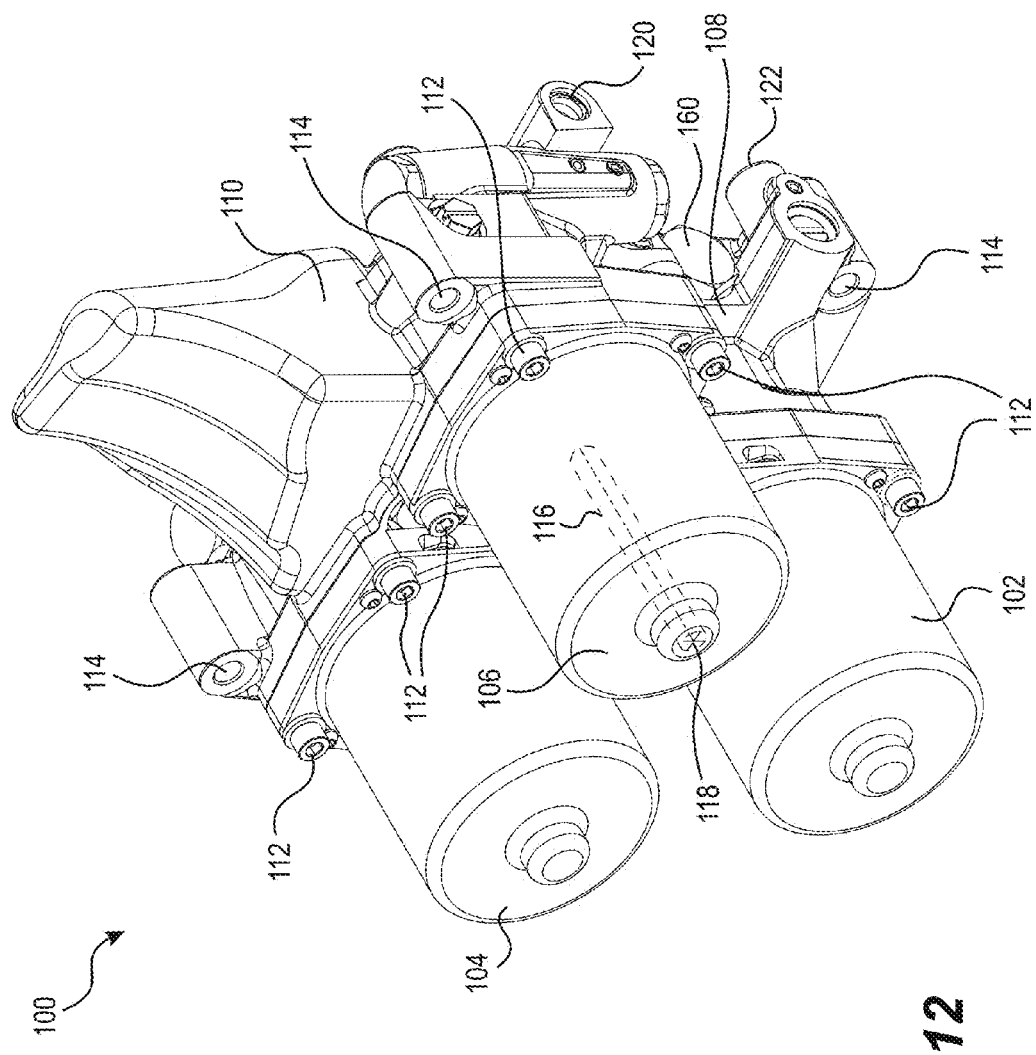
FIG. 12 is a perspective view taken from a front, left side of a hydraulic unit of the bracket assembly of FIG. 7.
Figure 14:
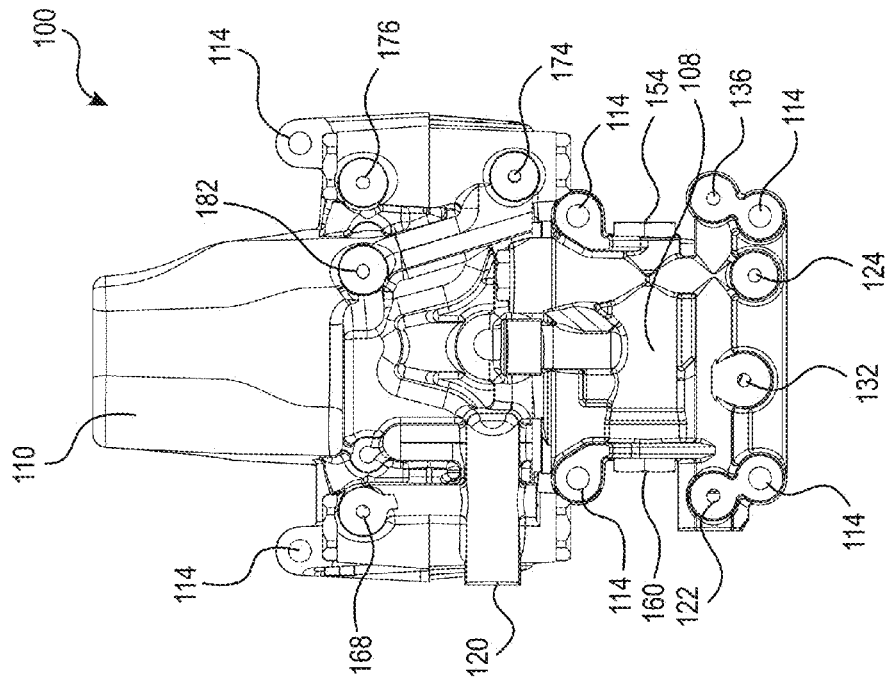
FIG. 14 is a rear elevation view of the hydraulic unit of FIG. 12.
Figure 13:
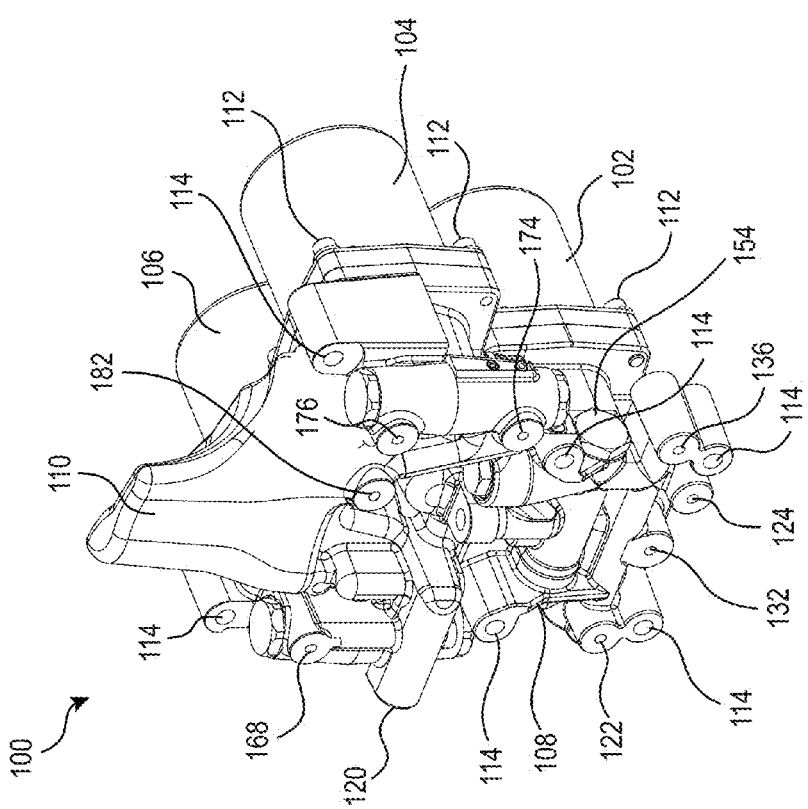
FIG. 13 is a perspective view taken from a rear, right side of the hydraulic unit of FIG. 12.

As best seen in FIGS. 12 to 14, the hydraulic unit 100 includes three pumps 102, 104, 106, a valve unit 108, and a hydraulic fluid reservoir 110. The pumps 102, 104, 106 are mounted via fasteners 112 to the valve unit 108. The valve unit 108 is mounted to the swivel bracket 50 via fasteners (not shown) inserted into apertures 114 provided in the valve unit 108. The fluid reservoir 110 is disposed on top of the valve unit 108 and is fastened to the valve unit 108.

Figure 8:
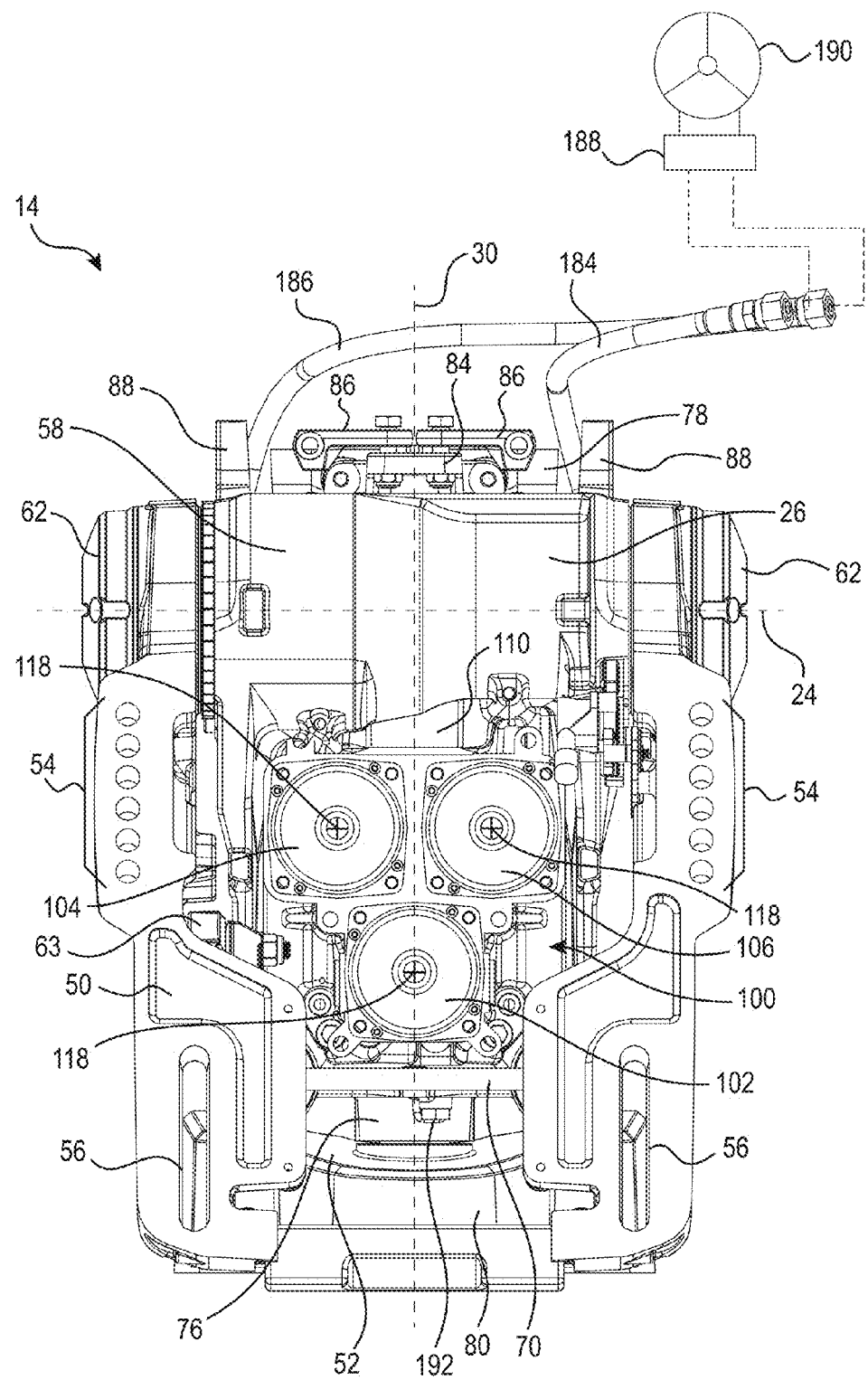
FIG. 8 is a front elevation view of the bracket assembly of FIG. 7.

As best seen in FIG. 8, when they are mounted to the swivel bracket 50, the pumps 102, 104, 106 are disposed in a triangular arrangement. In this arrangement, the pump 102 is disposed on a lower half of the swivel bracket 50 along a lateral center of the swivel bracket 50, which corresponds to the steering axis 30 in FIG. 8.

The pumps 102, 104, 106 are bi-directional electric pumps. Each pump 102, 104, 106 includes a motor (not shown), a shaft 116 (shown in dotted lines only for pump 106 in FIG. 12) and a pumping member (not shown). The motor is connected to the shaft 116 which is itself connected to the pumping member. The motor drives the pumping member by causing the shaft 116 to rotate about a pump axis 118. The direction of the flow of hydraulic fluid from each pump 102, 104, 106 can be changed by changing the direction of rotation of their respective motors. It is contemplated that the pumps 102, 104, 106 could be unidirectional pumps, in which case it is contemplated that a system of valves could be used to vary the direction of the flow. It is also contemplated that other types of pumps could be used, such as, for example, axial flow pumps or reciprocating pumps. When they are mounted to the swivel bracket 50, the pump axes 118 of the pumps 102, 104, 106 are generally perpendicular to the tilt/trim axis 24 and to the steering axis 30 as can be seen in FIG. 8. The volume of each pump 102, 104, 106 acts as a hydraulic fluid reservoir.

The pump 102 is used to supply hydraulic fluid to the rotary actuator 26 and the linear actuators 22. Therefore, actuation of the pump 102 controls the tilt and trim. It is contemplated that the pump 102 could be replaced with two pumps: one controlling the upward motion (tilt/trim up) and one controlling the downward motion (tilt/trim down). The pump 102 is fluidly connected to the fluid reservoir 110 via the valve unit 108. The fluid present in the reservoir 110 and the volume of the reservoir 110 account for the variation in volume of hydraulic fluid in the hydraulic circuit to which the pump 102 is connected that is caused by the displacement of the pistons 66 in the linear actuators 22.

Hydraulic fluid can be added to the fluid reservoir 110 via a reservoir inlet 120. When the hydraulic unit 100 is mounted to the swivel bracket 50, the reservoir inlet 120 is in alignment with an aperture (not shown) in the side of the swivel bracket 50. As such, the reservoir 110 can be filled without having to remove it from the swivel bracket 50. As can be seen in FIG. 12, the reservoir inlet 120 is located below the main volume of the reservoir 110 when the swivel bracket is in the upright position. To fill the reservoir 110, the swivel bracket 50 is tilted up to its highest position. This brings at least a portion of the main volume of the reservoir 110 below the reservoir inlet 120. Filling the reservoir 110 in this position up to the level of the inlet 120 ensures that the proper amount of hydraulic fluid is present in the reservoir 110.

The pump 102 is fluidly connected to a valve assembly located in the valve unit 108. To trim the swivel bracket 50 up, the pump 102 pumps fluid from the reservoir 110 and fluid from the pump 102 is caused by the valve assembly to flow out of apertures 122, 124 in the valve unit 108. From the aperture 122, the fluid flows to an aperture 126 in the swivel bracket 50. From the aperture 126, the fluid flows in a passage (not shown) integrally formed in the swivel bracket 50 to the left linear actuator 22. From the aperture 124, the fluid flows to an aperture 128 in the swivel bracket 50. From the aperture 128, the fluid flows in a passage (not shown) integrally formed in the swivel bracket 50 to the right linear actuator 22. As explained above, this causes both linear actuators 22 to push the swivel bracket 50 away from the stern bracket 52. To trim the swivel bracket 50 down, fluid is drawn from both linear actuators 22 by the pump 102. From the linear actuators 102, fluid flows through passages (not shown) integrally formed in the swivel bracket 50 to an aperture 130 in the swivel bracket 50. From the aperture 130, fluid flows in an aperture 132 in the valve unit 108 and back to the pump 102 and the reservoir 110.

To tilt the swivel bracket 50 up, fluid from the pump 102 is caused by the valve assembly to flow out of the aperture 122 in the valve unit 108, through the aperture 126 in the swivel bracket 50. From the aperture 126, fluid flows in another passage (not shown) integrally formed in the swivel bracket 50 to a port (not shown) in the main body 58 to supply the fluid to the left side of the piston of the rotary actuator 26. As this occurs, fluid on the right side of the piston of the rotary actuator 26 flows out of another port (not shown) in the main body 58 into another passage (not shown) integrally formed in the swivel bracket 50. From this passage, fluid flows out of an aperture 134 in the swivel bracket 50 into an aperture 136 in the valve unit 108 and back to the pump 102. As explained above, this causes the swivel bracket 50 to pivot away from the stern bracket 52.

To tilt the swivel bracket 50 down, fluid from the pump 102 is caused by the valve assembly to flow out of the aperture 136 in the valve unit 108, into the aperture 134 in the swivel bracket 50 and to the port in the main body 58 to supply hydraulic fluid to the right side of the piston of the rotary actuator 26. As this occurs, fluid on the left side of the piston of the rotary actuator 26 flows out of its associated port to the aperture 126 in the swivel bracket 50, into the aperture 122 in the valve unit 108 and back to the pump 102.

It should be noted that, as the swivel bracket 50 is being trimmed up or down by the linear actuators 22, fluid is being simultaneously supplied to the rotary actuator 26 to obtain the same amount of angular movement in the same direction and at the same rate.

The pump 102 is actuated in response to the actuation by the driver of the watercraft of tilt and trim actuators (not shown) in the form of switches, buttons or levers for example. It is contemplated that the pump 102 could also be controlled by a control unit of the outboard engine 10 or of the watercraft to automatically adjust a trim of the drive unit 12 based on various parameters such as watercraft speed, engine speed and engine torque for example.

Figure 15:
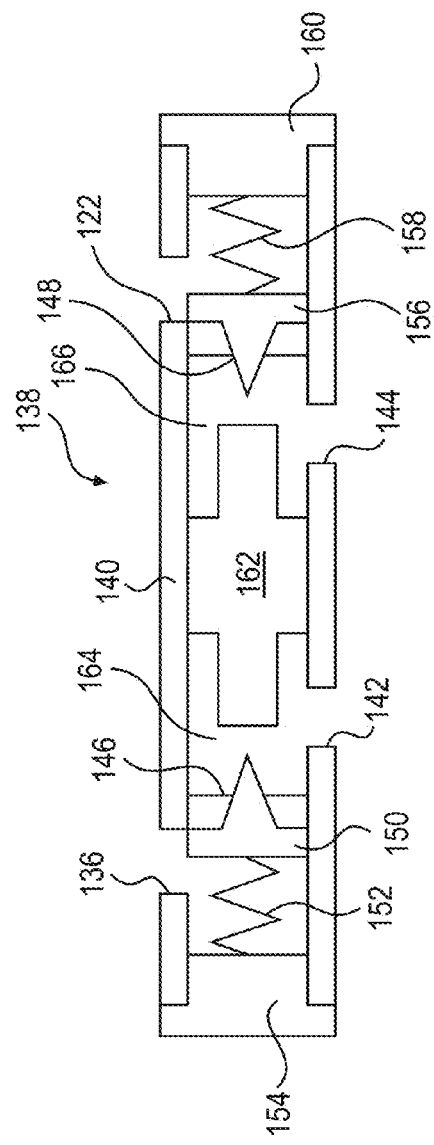
FIG. 15 is a schematic representation of a valve assembly of the hydraulic unit of FIG. 12 with the valves is a closed position.
Figure 16:
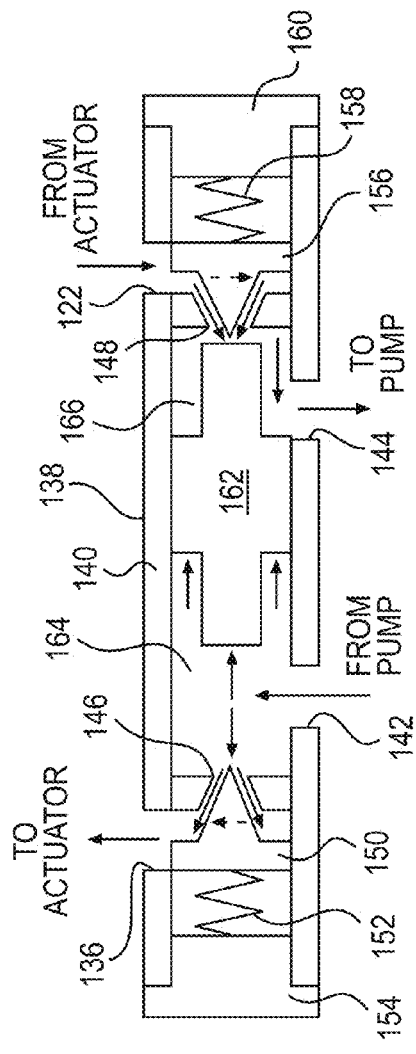
FIG. 16 is a schematic representation of the valve assembly of FIG. 15 with the valves is an opened position.
Figure 17:
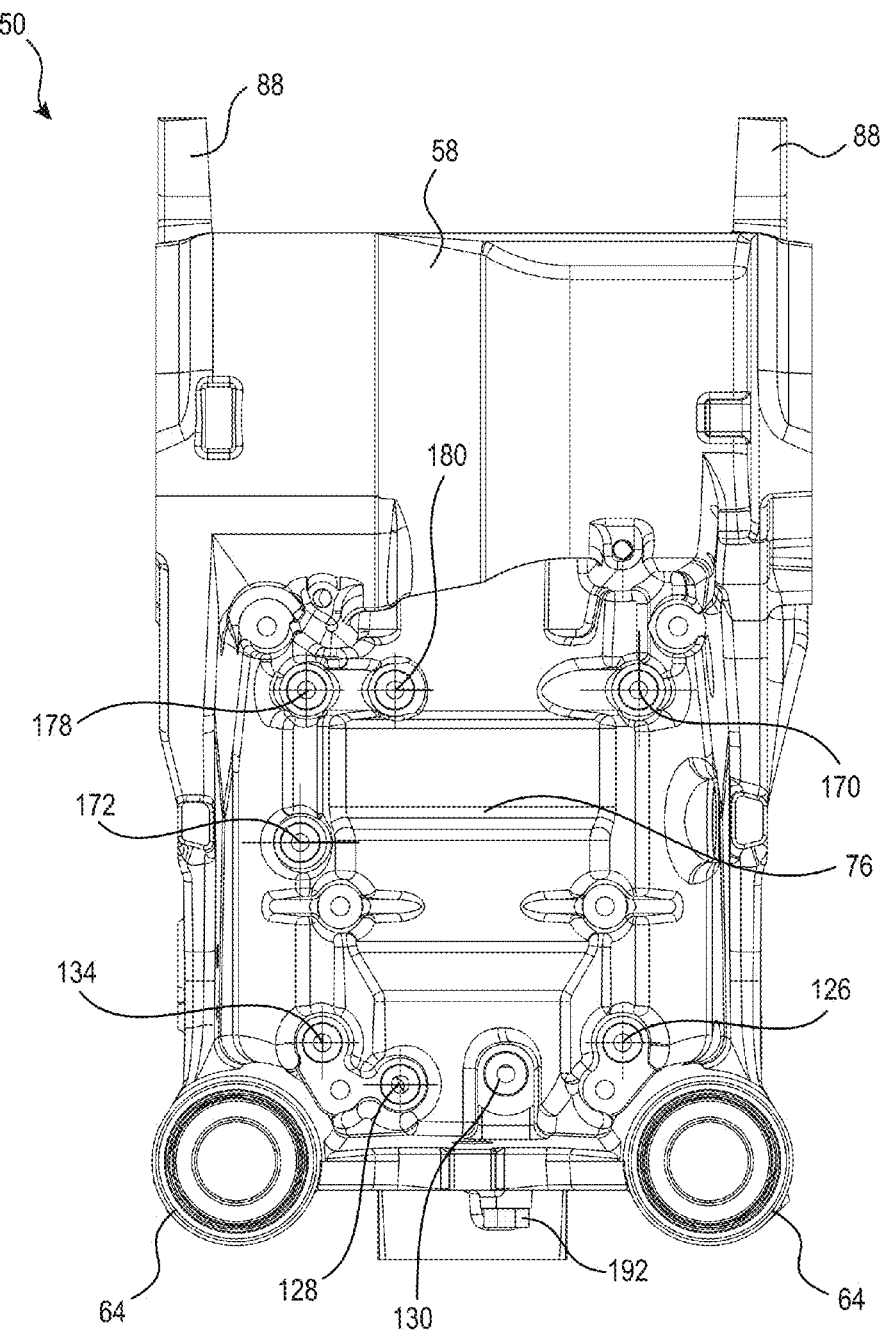
FIG. 17 is a front elevation view of a swivel bracket of the bracket assembly of FIG. 7.
Figure 19:
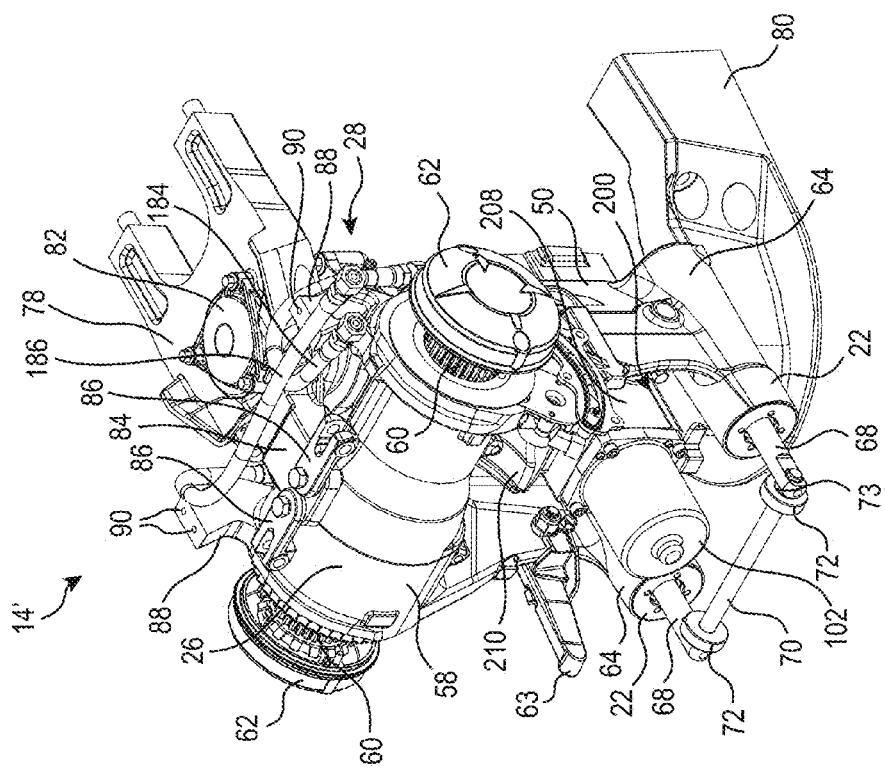
FIG. 19 is a perspective view taken from a front, left side of the bracket assembly of FIG. 18 with the stern bracket removed.

The valve assembly used to open and close the apertures 122 and 136 is a shuttle type spool valve similar to the one schematically illustrated in FIGS. 15 and 16 (i.e. valve assembly 138). The valve assembly 138 includes a body 140 in which are formed the apertures 122, 136, 142 and 144. The apertures 142 and 144 fluidly communicated with the pump 102. Valve ports 146, 148 are formed in the body 140. A valve body 150 is biased by a spring 152 to normally close the port 146. A threaded cap 154 is located at the end of the body 140 where the spring 152 is located. A valve body 156 is biased by a spring 158 to normally close the port 148. A threaded cap 160 is located at the end of the body 140 where the spring 158 is located. A shuttle 162 is disposed in the body 140 between the valve ports 146, 148 and the apertures 142, 144, thus forming two variable volume chambers 164, 166 in the body 140.

When the pump 102 is not being operated, the valve assembly 138 is in the configuration shown in FIG. 15. Any hydraulic pressure being applied by the piston of the rotary actuator 26 forces the valve bodies against the ports 146, 148, thus preventing fluid flow to the pump 102.

When the pump 102 is operated to supply fluid through aperture 142, as in FIG. 16, the hydraulic pressure created in the chamber 164 pushes against the valve body 150, overcoming the bias of the spring 152, and thus opening the port 146. As a result, the hydraulic fluid can flow out of the aperture 136 to the rotary actuator 26 to tilt the swivel bracket 50 down. The hydraulic pressure created in the chamber 164 also pushes against the shuttle 162 which in turn pushes the protruding tip of the valve body 156, thus overcoming the bias of the spring 158 and opening the port 148. This allows fluid in the rotary actuator 26 that is displaced by the motion of the piston in the rotary actuator 26 to flow from the aperture 122 to the aperture 144 and back to the pump 102.

As would be understood, when the pump 102 is operated to supply fluid through aperture 144, the hydraulic pressure created in the chamber 166 opens the port 148 and causes the shuttle 162 to open the port 146. Therefore, hydraulic fluid can flow in the direction opposite to the one illustrated in FIG. 16.

It is contemplated that other types of valves or valve assemblies could be used instead of the valve assembly 138, such as, for example, the valve assembly 338 of FIGS. 25 to 27 described further below.

The pumps 104 and 106 are used to supply hydraulic fluid to the rotary actuator 28. Therefore, actuation of the pumps 104 and 106 control left and right steering of the drive unit 12. In the present embodiment, both pumps 104, 106 are used for both left and right steering motion. It is contemplated that only one of the pumps 104, 106 could be used for providing the left steering motion with the other one of the pumps 104, 106 being used for providing the right steering motion. It is also contemplated that each one of the pumps 104, 106 could normally be used for providing one steering motion each with the other one of the pumps 104, 106 being used to provide a boost in pressure to steer when needed or to provide the pressure in case of failure of the pump normally being used to steer in a particular direction. It is also contemplated that only one pump could be used to supply the hydraulic pressure to the rotary actuator 28 to steer both left and right.

The pumps 104, 106 are fluidly connected to valve assemblies located in the valve unit 108. The valve assemblies are similar to the valve assembly 138 described above, but it is contemplated that other types of valves and valve assemblies could be used.

To steer the drive unit 12 to the left, fluid from the pumps 104, 106 is caused by the valve assemblies to flow out of an aperture 168 in the valve unit 108 into an aperture 170 in the swivel bracket 50. From the aperture 170, fluid flows in a passage (not shown) integrally formed in the swivel bracket 50 to a port (not shown) in the main body 76 of the rotary actuator 28 to supply the fluid above the piston of the rotary actuator 28. As this occurs, fluid on the bottom of the piston of the rotary actuator 28 flows out of another port (not shown) in the main body 76 into another passage (not shown) integrally formed in the swivel bracket 50. From this passage, fluid flows out of an aperture 172 in the swivel bracket 50 into an aperture 174 in the valve unit 108 and back to the pumps 104, 106. As explained above, this causes the drive unit to steer left.

To steer the drive unit 12 to the right, fluid from the pumps 104, 106 is caused by the valve assemblies to flow out of an aperture 176 in the valve unit 108 into an aperture 178 in the swivel bracket 50. From the aperture 178, fluid flows in a passage (not shown) integrally formed in the swivel bracket 50 to a port (not shown) in the main body 76 of the rotary actuator 28 to supply the fluid below the piston of the rotary actuator 28. As this occurs, fluid on the top of the piston of the rotary actuator 28 flows out of another port (not shown) in the main body 76 into another passage (not shown) integrally formed in the swivel bracket 50. From this passage, fluid flows out of the aperture 172 in the swivel bracket 50 into the aperture 174 in the valve unit 108 and back to the pumps 104, 106. As explained above, this causes the drive unit to steer right.

The swivel bracket 50 is also provided with an aperture 180 that fluidly communicates with the rotary actuator 28 via passages (not shown) integrally formed in the swivel bracket 50. The aperture 180 communicates with an aperture 182 in the valve unit 108. The aperture 182 fluidly communicates with the reservoir 110 via passages (not shown) in the valve unit 108. A normally closed pressure relief valve (not shown) is disposed in the valve unit 108 between the aperture 182 and the reservoir 110. Should the pressure in the hydraulic circuit between the pumps 104, 106 and the rotary actuator 28 exceed a predetermined amount, the pressure relief valve opens causing the hydraulic fluid to go in the fluid reservoir 110, thus preventing further increase in hydraulic pressure.

The pumps 104, 106 are actuated in response to signals received from one or more sensors sensing a position of a helm assembly 190 of the watercraft.

Figure 7:
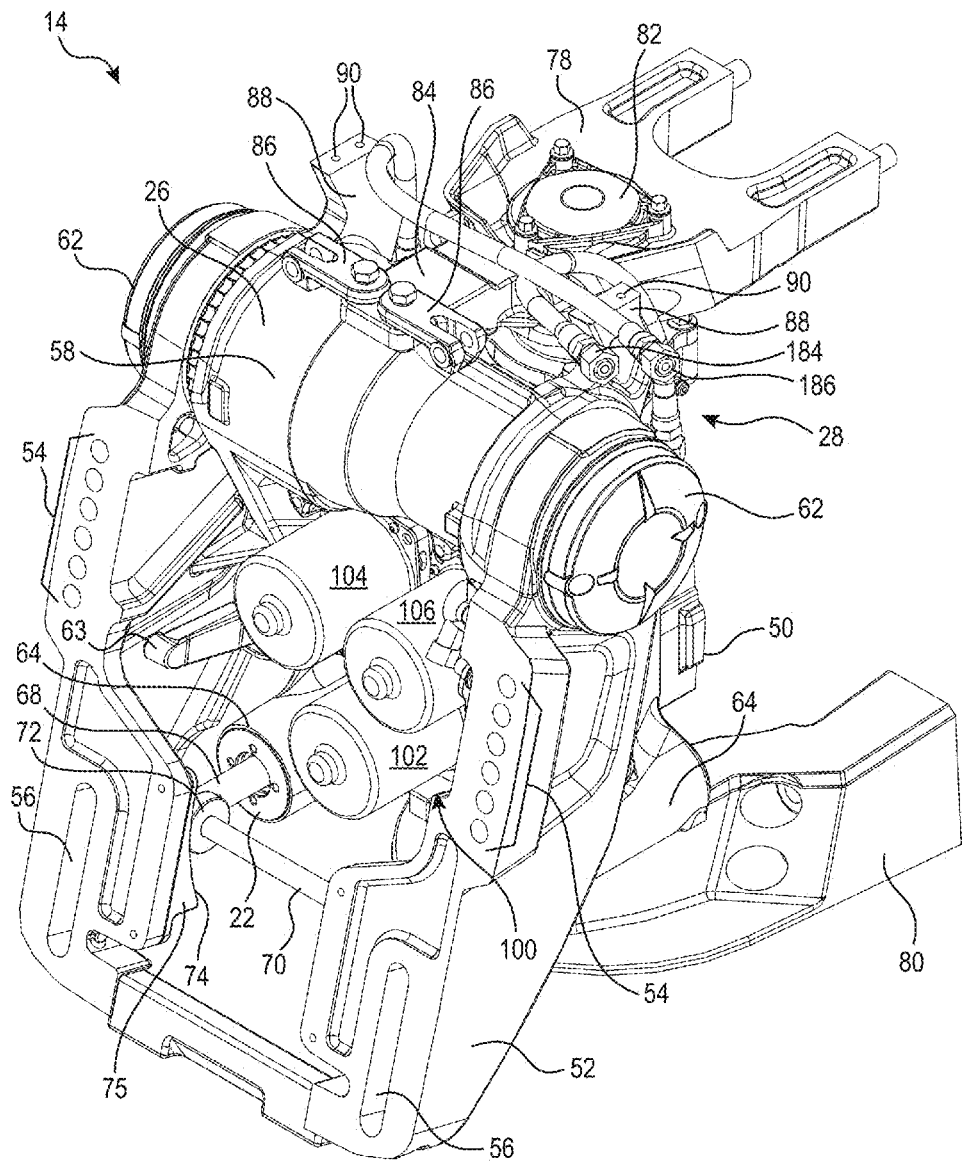
FIG. 7 is a perspective view taken from a front, left side of a bracket assembly of the outboard engine of FIG. 1.

As illustrated in FIGS. 7 to 9, the bracket assembly 14 is provided with hydraulic lines 184, 186 connected to openings (not shown) in the sides of the swivel bracket 50. The opening in the swivel bracket 50 for the line 184 communicates with a passage in the swivel bracket 50 that is connected to the passage between the aperture 170 of the swivel bracket 50 and the rotary actuator 28. The opening in the swivel bracket 50 for the line 186 communicates with a passage in the swivel bracket 50 that is connected to the passage between the aperture 178 of the swivel bracket 50 and the rotary actuator 28. The lines 184, 186 are routed through the box 48 and are fluidly connected to a hydraulic actuator 188 driven by the helm assembly 190 of the watercraft as schematically illustrated in FIG. 8. When the driver turns the helm assembly 190 left, the actuator 188 pushes hydraulic fluid in the line 184, which is then supplied to the rotary actuator 28 to cause the drive unit 12 to turn left. When the driver turns the helm assembly 190 right, the actuator 188 pushes hydraulic fluid in the line 186 which is then supplied to the rotary actuator 28 to cause the drive unit 12 to turn right. The pumps 104, 106 are actuated as indicated above in response to rotation of the helm assembly 190 to supplement the hydraulic pressure supplied by the lines 184, 186. The hydraulic lines 184, 186 are optional. When the optional lines 184, 186 are not being used, as in the case of a steering-by-wire system, their respective openings in the swivel bracket 50 are capped.

To drain the hydraulic fluid from the hydraulic unit 100, a threaded fastener 192 (FIG. 8) is removed from an aperture (not shown) in the bottom of the swivel bracket 50. Hydraulic fluid from the hydraulic unit 100 flows out of the aperture 132 in the valve unit 108, into the aperture 130 in the swivel bracket 50, through a passage integrally formed in the swivel bracket 50, and out through the aperture at the bottom of the swivel bracket 50.

When the hydraulic unit 100 is mounted to the swivel bracket 50, every aperture of the valve unit 108 is in alignment with and adjacent to its corresponding aperture in the swivel bracket 50. As such, no hydraulic lines need to be connected between corresponding apertures, which simplifies the mounting of the hydraulic unit 100 to the swivel bracket 50.

Turning now to FIGS. 18 to 22, a bracket assembly 14', which is an alternative embodiment of the bracket assembly 14 described above, will be described. The bracket assembly 14' is the same as the bracket assembly 14 except that the hydraulic unit 100 has been replaced with a hydraulic unit 200. Therefore, for simplicity, elements of the bracket assembly 14' that are the same as those of the bracket assembly 14 have been labeled with the same reference numerals and will not be described again in detail.

The hydraulic unit 200 includes a pump 102 (same type as above), a valve unit 208, and a hydraulic fluid reservoir 210. The pump 102 is mounted via fasteners 112 to the valve unit 208. The valve unit 208 is mounted to the swivel bracket 50 via fasteners inserted into apertures 114 provided in the valve unit 208. The fluid reservoir 210 is disposed on top of the valve unit 208 and is fastened to the valve unit 208.

Figure 18:
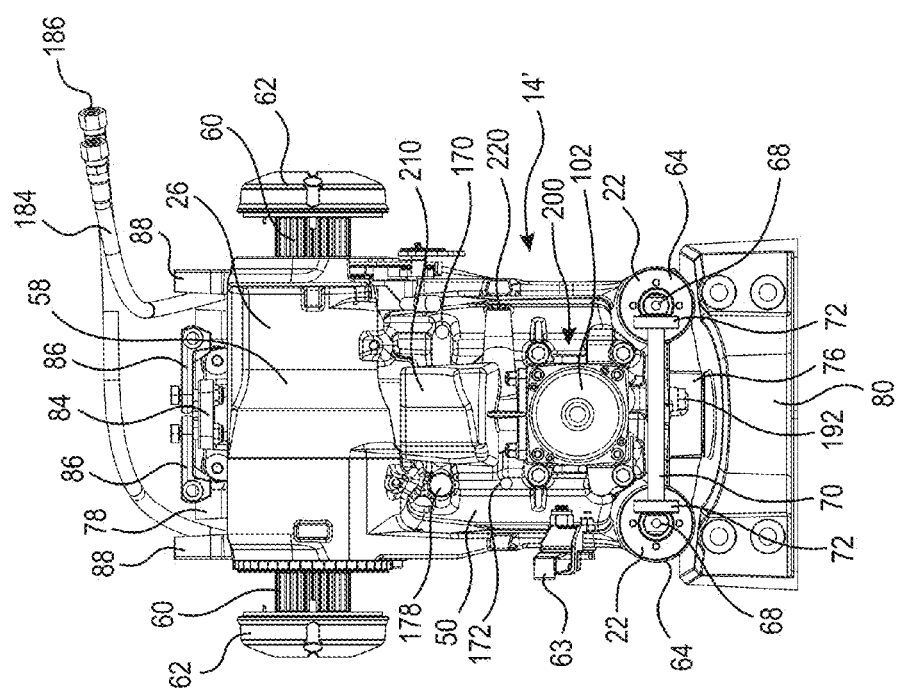
FIG. 18 is a front elevation view of an alternative embodiment of a bracket assembly of the outboard engine of FIG. 1 with a stern bracket removed.
Figure 20:
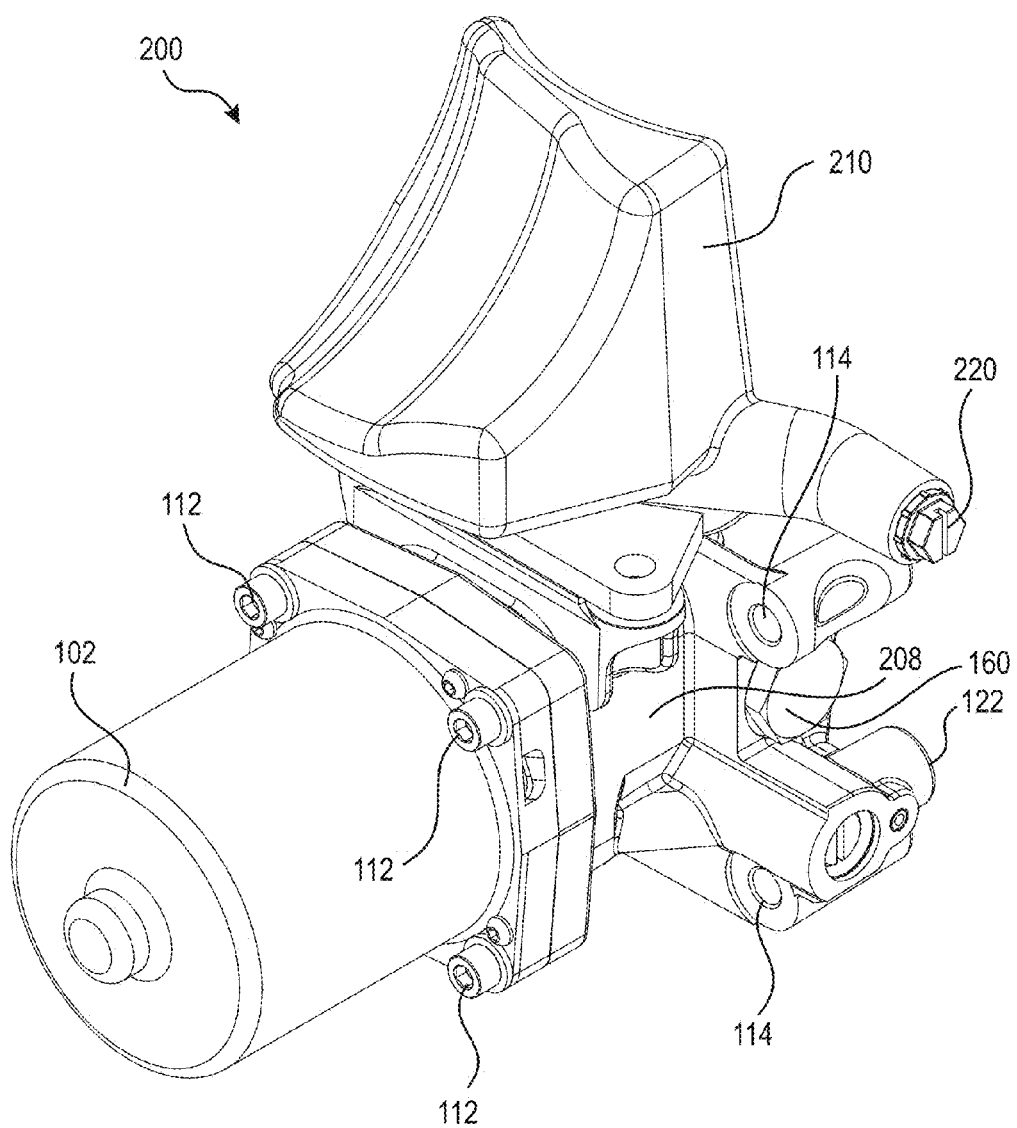
FIG. 20 is a perspective view taken from a front, left side of a hydraulic unit of the bracket assembly of FIG. 18.

As best seen in FIG. 18, the pump 102 is disposed on a lower half of the swivel bracket 50 along a lateral center of the swivel bracket 50, which corresponds to the steering axis 30.

The valve unit 208 corresponds to the lower part of the valve unit 108 described above. As such, the valve unit 208 is provided with apertures 122, 124, 132 and 136 that perform the same function and communicate with the same apertures in the swivel bracket 50 as the apertures 122, 124, 132 and 136 of the valve unit 108. As would be understood, the pump 102 is therefore used in tilting and trimming the swivel bracket 50 relative to the stern bracket 52.

The reservoir 210 fluidly communicates with the valve unit 208 to supply fluid to or receive fluid from the valve unit 208. The reservoir has a reservoir inlet 220 that is used to fill the reservoir 210 in the same manner as the reservoir inlet 120 of the reservoir 110 described above. The reservoir 210 and its inlet 220 are shaped differently from the reservoir 110 and its inlet 120 in order to properly be received in its different location on the swivel bracket 52.

Since the hydraulic unit 200 is not provided with pumps to supply hydraulic fluid to the rotary actuator 28 used to steer the drive unit 12, in order to steer the drive unit 12, hydraulic fluid is provided to the rotary actuator 28 via the lines 184, 186 from the hydraulic actuator 188 driven by the helm assembly 190 of the watercraft in the same manner as is schematically illustrated in FIG. 8. The apertures 170, 172, 178 and 180 of the swivel bracket 50 are therefore capped, as they are not being used in this embodiment. It is contemplated that the swivel bracket 50 could be replaced by a different swivel bracket that does not have the apertures 170, 172, 178 and 180.

It is contemplated that the hydraulic unit 200 could have a different valve unit 208 that has additional apertures, valves and valves assemblies, such that the valve unit 208 would fluidly communicate with the apertures 170, 172, 178 and 180 in the swivel bracket 50 such that the pump 102 would be used for tilting, trimming and steering the drive unit 12. It is also contemplated that at least some elements of the hydraulic unit 200 could be mounted to the stern bracket 52.

Figure 23:
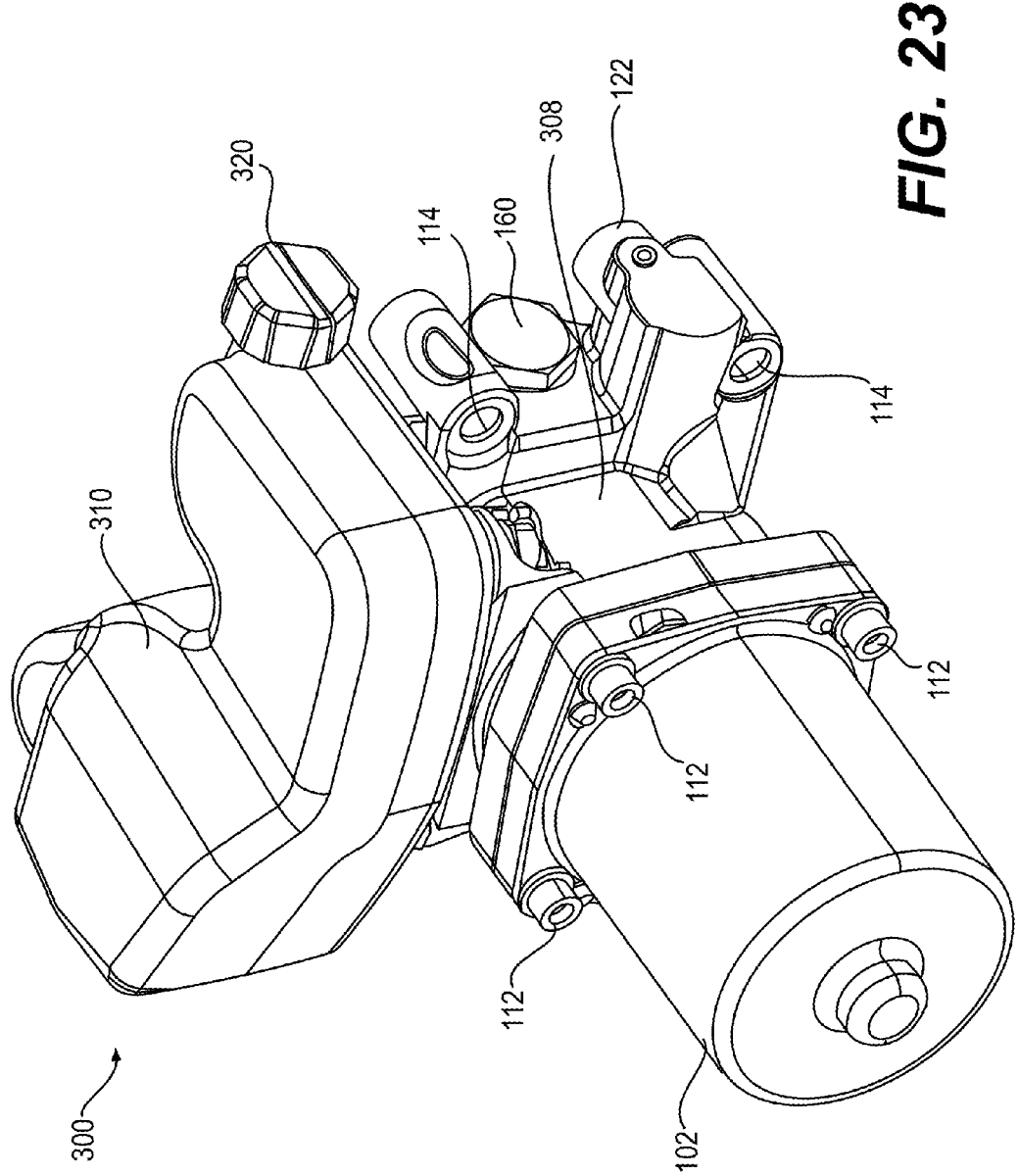
FIG. 23 is a perspective view taken from a front, left side of an alternative embodiment of the hydraulic unit of FIG. 20.
Figure 24:
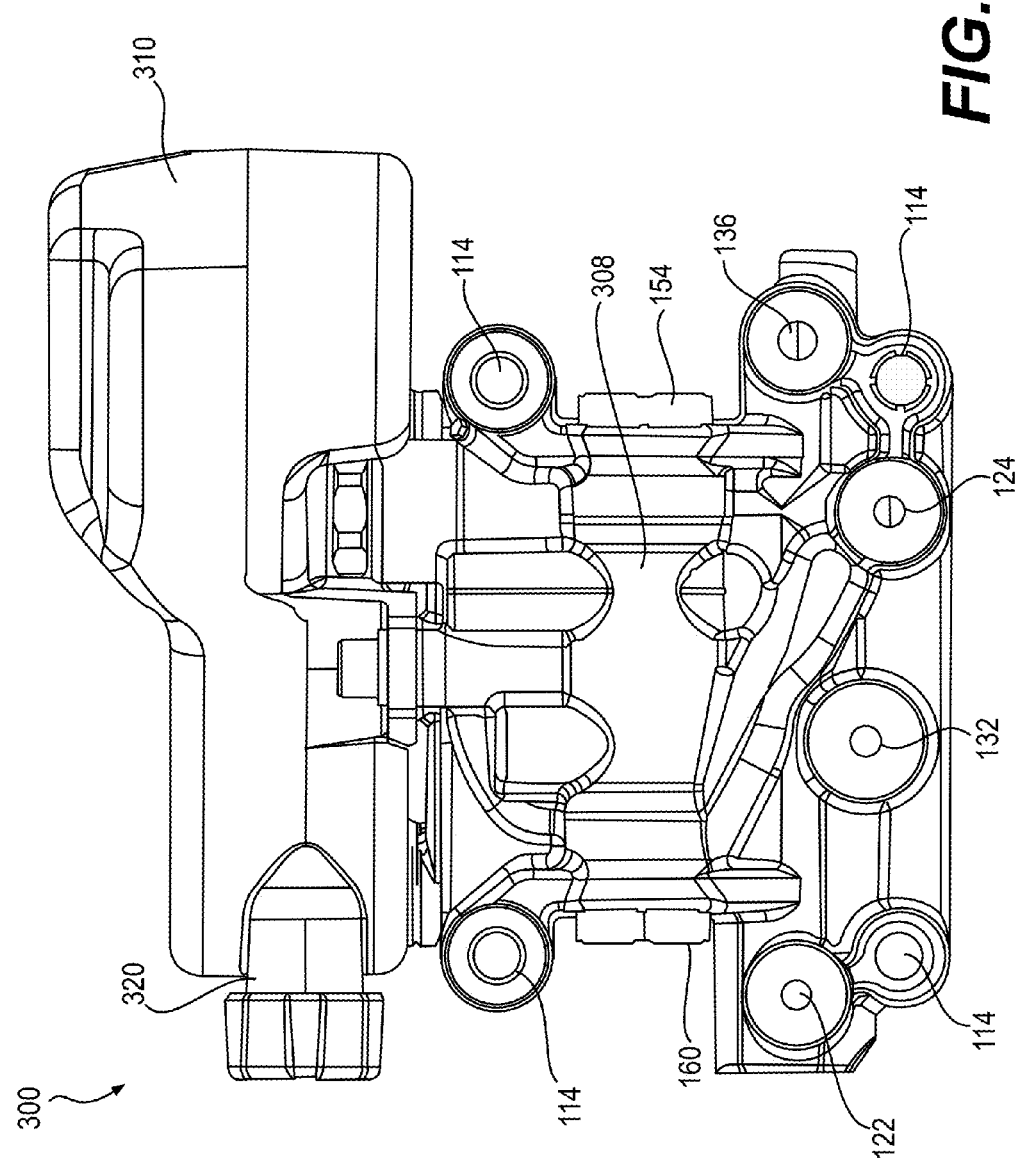
FIG. 24 is a rear elevation view of the hydraulic unit of FIG. 23.

Turning now to FIGS. 23 and 24, hydraulic unit 300, which is an alternative embodiment of the hydraulic unit 200 described above, will be described. The hydraulic unit 300 is adapted to be provided on the bracket assembly 14' described above in the same manner as the hydraulic unit 200. The hydraulic unit 300 is the same as the hydraulic unit 200 except that the valve unit 208 and the fluid reservoir 310 have been replaced with a valve unit 308 and a fluid reservoir 310 respectively. Therefore, for simplicity, elements of the hydraulic unit 300 that are the same as those of the hydraulic unit 200 have been labeled with the same reference numerals and will not be described again in detail.

The valve unit 308 is the similar to the valve unit 208 described above except that it has a valve assembly 338 instead of the valve assembly 138. The valve assembly 338 will be described in more detail below. As such, the valve unit 308 is provided with apertures 122, 124, 132 and 136 that communicate with the same apertures in the swivel bracket 50 as the apertures 122, 124, 132 and 136 of the valve unit 208. As would be understood, the pump 102 is therefore used in tilting and trimming the swivel bracket 50 relative to the stern bracket 52.

The reservoir 310 fluidly communicates with the valve unit 308 to supply fluid to or receive fluid from the valve unit 308. The reservoir has a reservoir inlet 320 that is used to fill the reservoir 310 in the same manner as the reservoir inlet 220 of the reservoir 210 described above. As can be seen, the reservoir 310 and its inlet 320 are shaped differently from the reservoir 210 and its inlet 220.

It is contemplated that the hydraulic unit 300 could have a different valve unit 308 that has additional apertures, valves and valves assemblies, such that the valve unit 308 would fluidly communicate with the apertures 170, 172, 178 and 180 in the swivel bracket 50 such that the pump 102 would be used for tilting, trimming and steering the drive unit 12. It is also contemplated that at least some elements of the hydraulic unit 300 could be mounted to the stern bracket 52.

Figure 25:
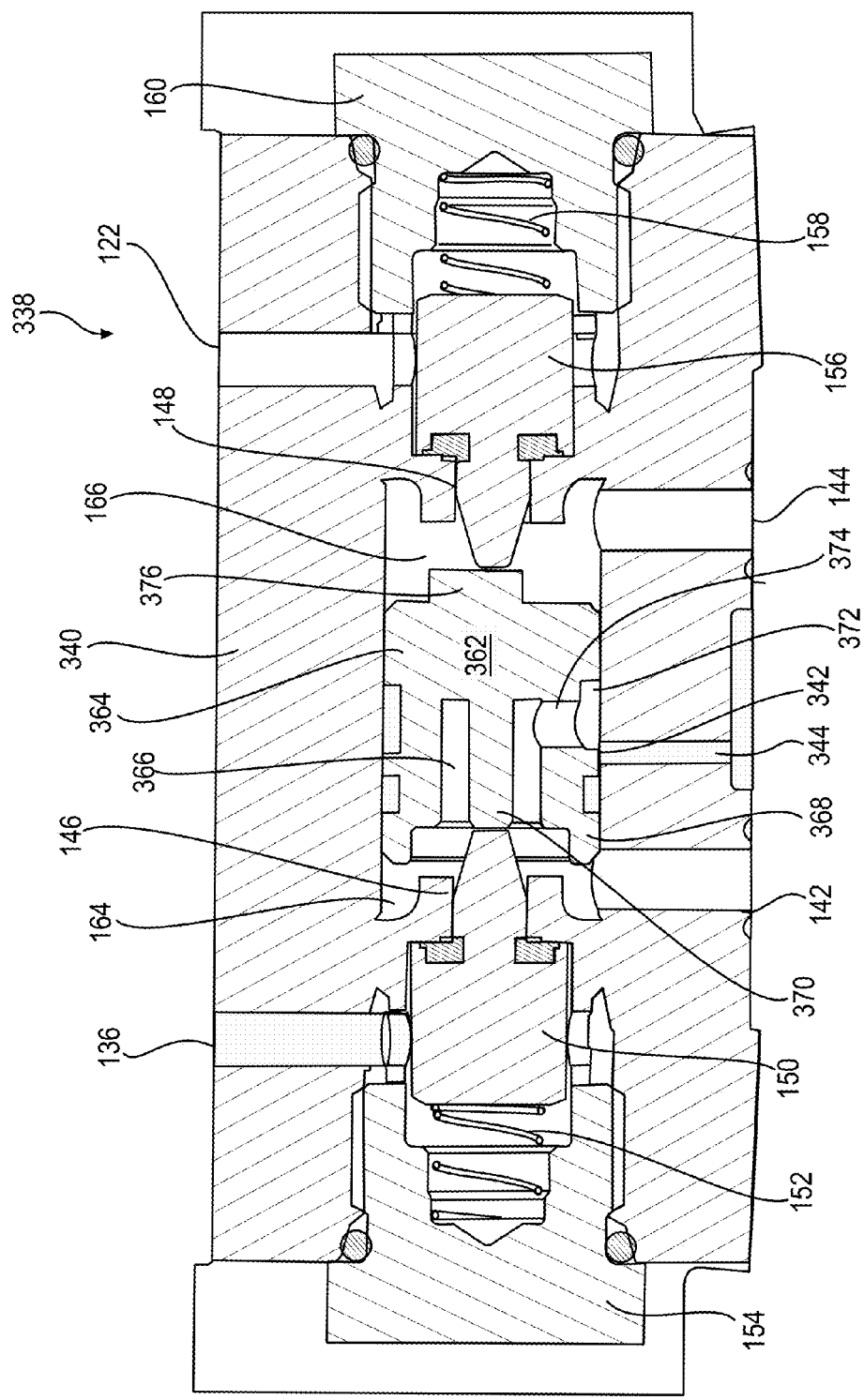
FIG. 25 is a cross-section of a valve assembly of the hydraulic unit of FIG. 23 with the valves is a closed position.
Figure 26:
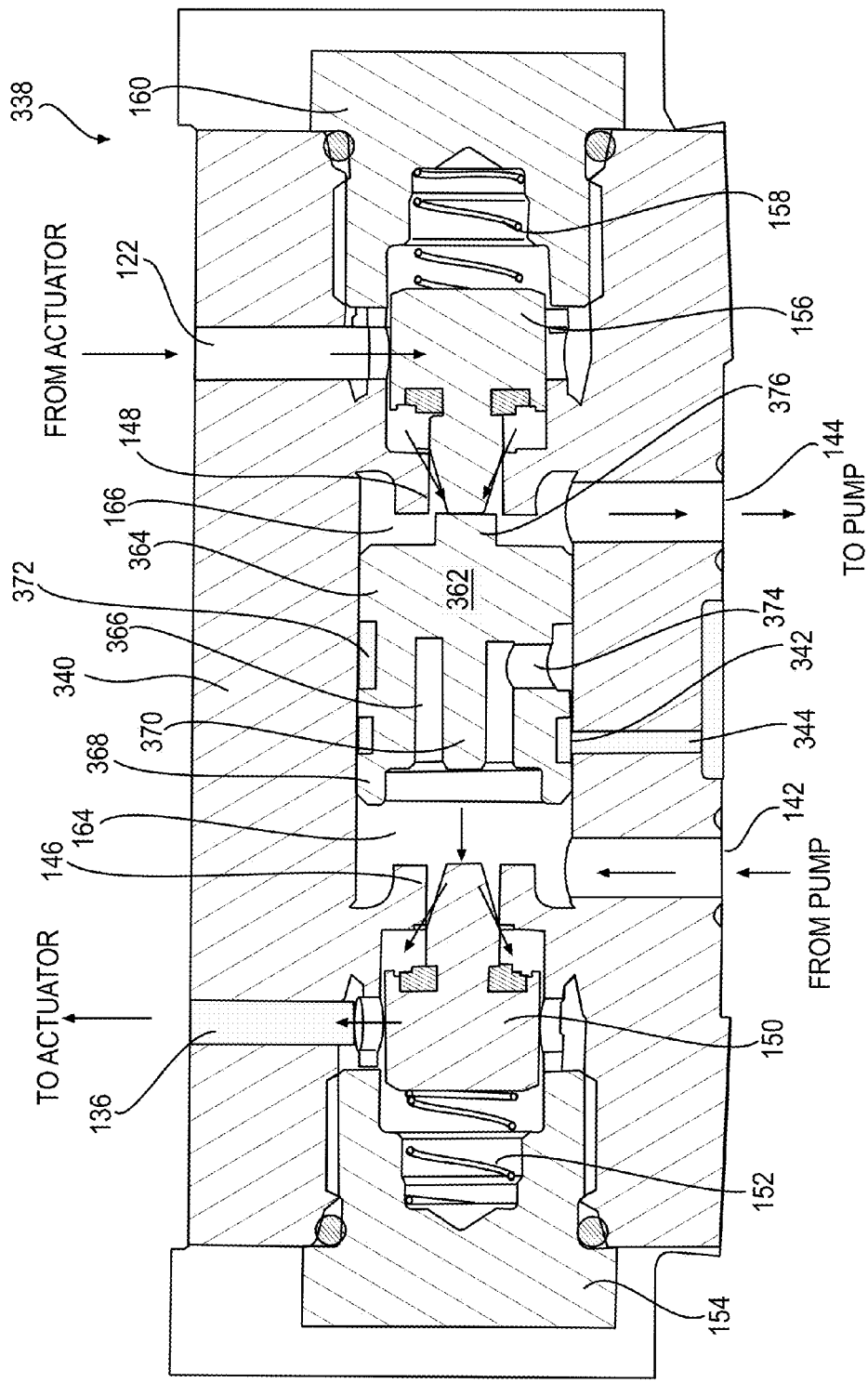
FIG. 26 is a cross-section of the valve assembly of FIG. 25 with the valves in a position to permit tilting down of the outboard engine of FIG. 1.
Figure 27:
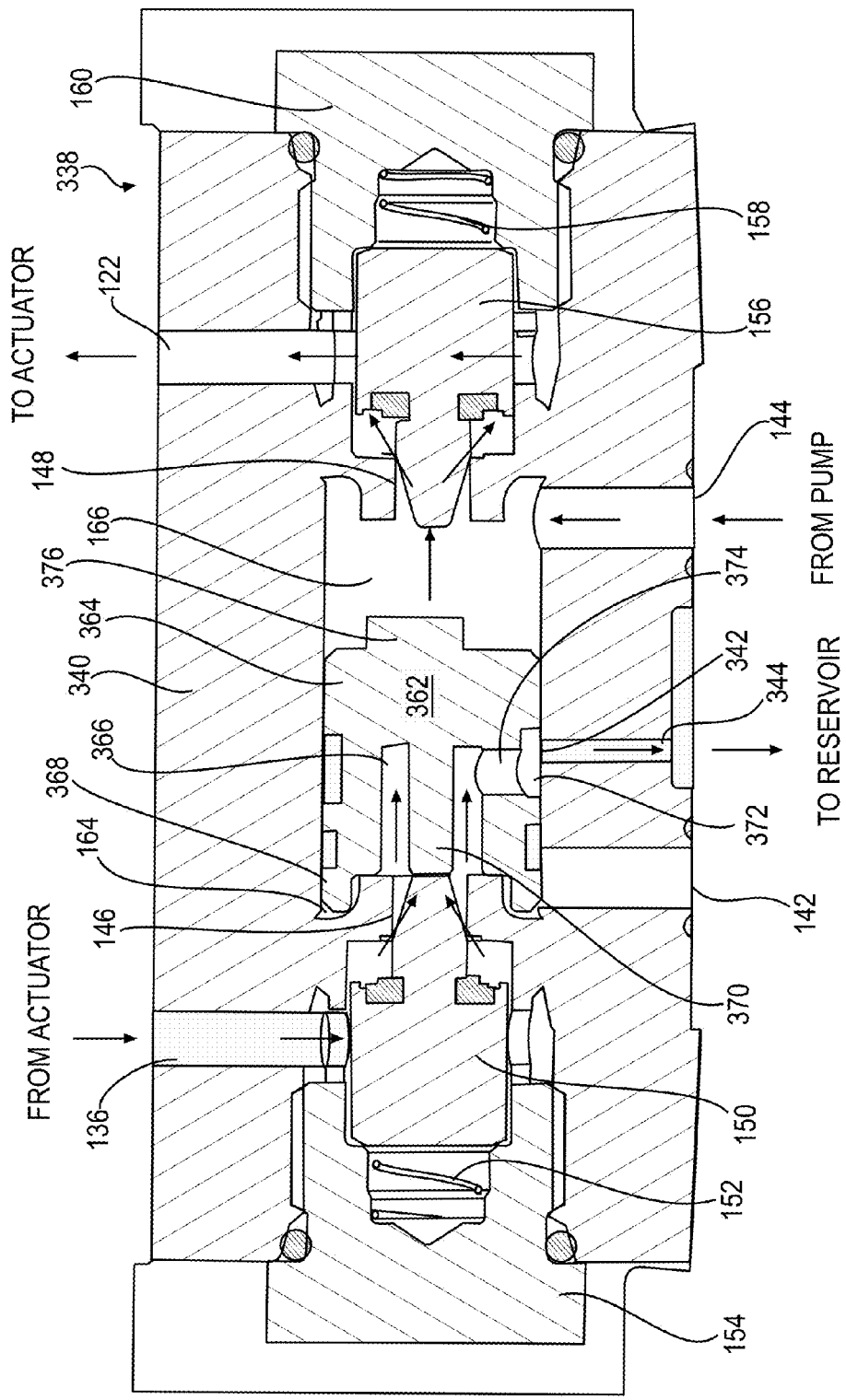
FIG. 27 is a cross-section of the valve assembly of FIG. 25 with the valves in a position to permit tilting up of the outboard engine of FIG. 1.

The valve assembly 338 used to control fluid flow into and out of the apertures 122, 124, 132 and 136 is a shuttle type spool valve as shown in FIGS. 25 to 27. The valve assembly 338 includes a body 340 in which are formed the apertures 122, 124, 132, 136, 142 and 144, as well as an aperture 342 not present in the previously described valve unit 208. The apertures 142 and 144 fluidly communicate with the pump 102. Valve ports 146, 148 are formed in the body 140. A valve body 150 is biased by a spring 152 to normally close the port 146. A threaded cap 154 is located at the end of the body 140 where the spring 152 is located. A valve body 156 is biased by a spring 158 to normally close the port 148. A threaded cap 160 is located at the end of the body 140 where the spring 158 is located. A shuttle 362 is disposed in the body 140 between the valve ports 146, 148 and the apertures 142, 144, thus forming two variable volume chambers 164, 166 in the body 140. The aperture 342 is connected to a passage 344 that fluidly communicates with the fluid reservoir 310.

Figure 29:
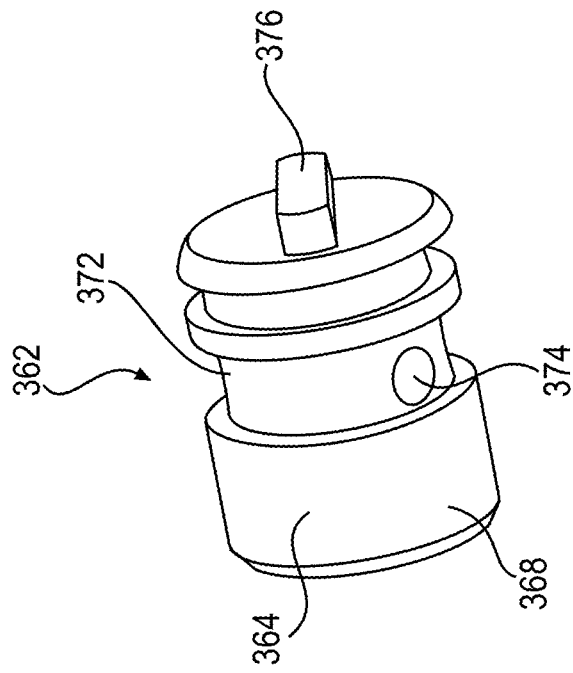
FIGS. 28 and 29 are perspective views of a shuttle of the valve assembly of FIGS. 25 to 27.
Figure 28:
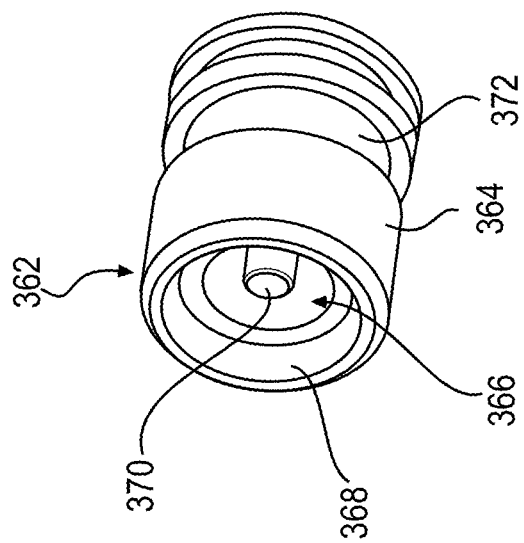

As can be seen in FIGS. 28 and 29, the shuttle 362 has a body 364. The body 364 has an annular passage 366 defined therein. The annular passage 366 is formed by a collar 368 at one end of the body 364 and a pin 370 in the center of the body 364. An annular channel 372 in the outer surface of the body 364 forms a surface passage. A cylindrical passage 374 extends radially through the body 364. The passage 374 connects the passage 366 with the channel 372. The passage 366, the passage 374 and the channel 372 will be collectively referred to as the shuttle passage below. It is contemplated that other constructions of the shuttle 362 could similarly form a shuttle passage as described herein. For example, it is contemplated that an alternate shuttle 362 could comprise a perforated plate for engaging the valve body 150 and opening the port 146, in place of the pin 370. A pin 376 extends from then end of the body 364 opposite the collar 368.

When the pump 102 is not in operation, the valve assembly 338 is in the position shown in FIG. 25. The valve bodies 150, 156 close the valve ports 146, 148 respectively, thereby preventing fluid communication between the pump 102 and the rotary actuator 26, and between the fluid reservoir 310 and the rotary actuator 26. As a result, the rotary actuator 26 maintains its position. In the present embodiment, the valve bodies 150, 156 stop fluid communication between the pump 102 and the rotary actuator 26, and between the fluid reservoir 310 and the rotary actuator 26.

When the pump 102 is operated to supply fluid through aperture 142, as in FIG. 26, the hydraulic pressure created in the chamber 164 pushes against the valve body 150, overcoming the bias of the spring 152, and thus opening the port 146. As a result, the hydraulic fluid can flow from the aperture 142, to the chamber 164, through the port 146 and out of the aperture 136 to the rotary actuator 26 to tilt the swivel bracket 50 down. The hydraulic pressure created in the chamber 164 also pushes against the shuttle 362 which in turn pushes the protruding tip of the valve body 156 with its pin 376, thus overcoming the bias of the spring 158 and opening the port 148. This allows fluid in the rotary actuator 26 that is displaced by the motion of the piston in the rotary actuator 26 to flow from the aperture 122 to the port 148, to the chamber 166, to the aperture 144 and back to the pump 102. As can be seen, the shuttle passage is not in alignment with the aperture 342 and the shuttle 362 closes the aperture 342, thereby preventing fluid communication between the chamber 164 and the fluid reservoir 310. In the present embodiment, the shuttle 362 impedes fluid communication between the chamber 164 and the fluid reservoir 310. Since the rotary actuator 26 is a balanced actuator, the volumetric rate at which hydraulic fluid is returned via the aperture 144 corresponds to the volumetric rate at which hydraulic fluid is supplied to the aperture 142. Therefore, the hydraulic fluid supplied by the pump 102 to one side of the piston of the rotary actuator 26 is equal to that drawn by the pump 102 from the other side of the piston of the rotary actuator 26.

When the pump 102 is operated to supply fluid through the aperture 144, as in FIG. 27, the hydraulic pressure created in the chamber 166 pushes against the valve body 156, overcoming the bias of the spring 158, and thus opening the port 148. As a result, the hydraulic fluid can flow from the aperture 144, to the chamber 166, through the port 148 and out of the aperture 122 to the rotary actuator 26 to tilt the swivel bracket 50 up. The hydraulic pressure created in the chamber 166 also pushes against the shuttle 362 which in turn pushes the protruding tip of the valve body 150 with its pin 370, thus overcoming the bias of the spring 152 and opening the port 146. With the shuttle 362 in this position, the collar 368 closes the aperture 142, thus preventing hydraulic fluid from flowing back to the pump 102 via the aperture 142. In this embodiment, the collar 368 impedes the flow of hydraulic fluid back to the pump 102 via the aperture 142. Also, in this position of the shuttle 362, the shuttle channel 372 is aligned with the aperture 342. This allows fluid in the rotary actuator 26 that is displaced by the motion of the piston in the rotary actuator 26 to flow from the aperture 136 to the port 146, through the shuttle passage, to the aperture 342, to the passage 344 and into the fluid reservoir 310. By returning the hydraulic fluid to the fluid reservoir 310, any air trapped in the hydraulic fluid being returned can be separated from the hydraulic fluid as it sits in the fluid reservoir 310. Since the pump 102 does not receive a significant amount of hydraulic fluid from the aperture 142, in order to supply hydraulic fluid to the actuator 26 via the aperture 144, the pump 102 draws hydraulic fluid from the fluid reservoir 310. As the air has been purged from the hydraulic fluid as it sits in the fluid reservoir 310, the hydraulic fluid supplied by the pump 102 to the rotary actuator 26 is significantly freer of air. It is contemplated that the collar 368 could only partially block the aperture 142 such that some hydraulic fluid is returned to the pump 102 and some hydraulic fluid is returned to the fluid reservoir 310.

Interrupting operation of the pump 102 returns the valve assembly 338 to the position shown in FIG. 25 and the rotary actuator 26, and therefore the swivel bracket 50, will remain in the position that they have when the ports 146, 148 are closed.

It is contemplated that the valve assembly 338 could be turned around such that hydraulic fluid is returned to the fluid reservoir 310 when the pump 102 is operated to tilt the swivel bracket 50 down. It is also contemplated that the valve assembly 338 could be modified to provide two shuttle passages in the shuttle 362 and two aperture 342 and passage 344 such that hydraulic fluid is returned to the fluid reservoir 310 when the pump 102 is operated to tilt the swivel bracket 50 up or down. It is also contemplated that the valve assembly 338 could be used to control the flow of hydraulic fluid to the steering rotary actuator 28 instead of the tilting rotary actuator 26.

Figure 30:
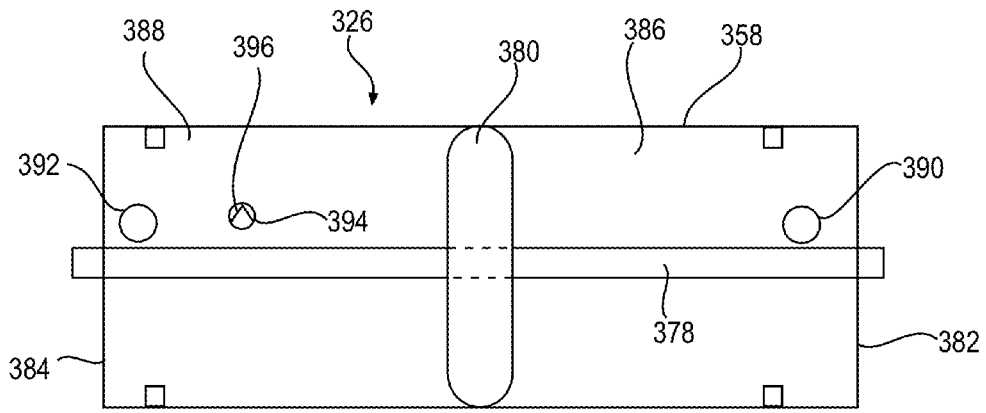
FIG. 30 is a schematic cross-section of an alternative embodiment of a hydraulic actuator to be used with the hydraulic unit of FIG. 23 with the actuator in an intermediate position.
Figure 31:
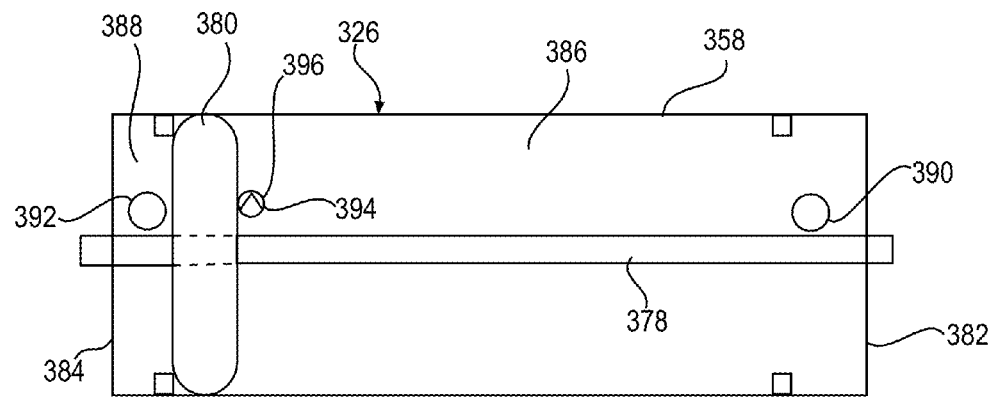
FIG. 31 is a schematic cross-section of the hydraulic actuator of FIG. 30 with the actuator in a full tilt up position.
Figure 32:
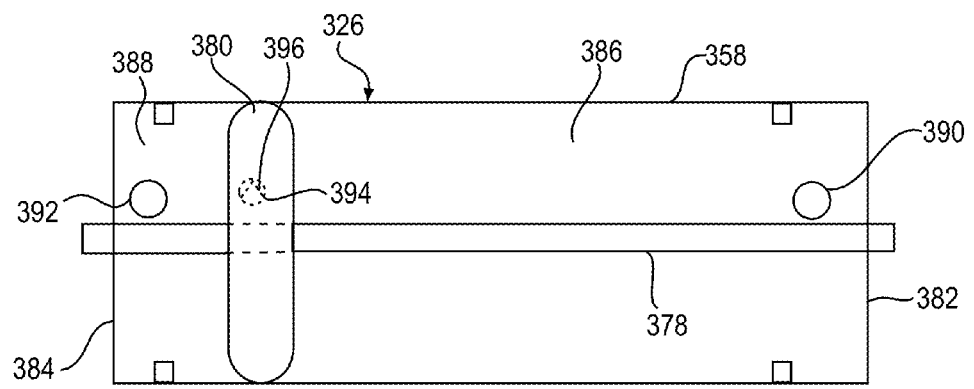
FIG. 32 is a schematic cross-section of the hydraulic actuator of FIG. 30 with the actuator in a tilt up position resulting from the pump being stopped when the actuator is in a full tilt up position.

FIGS. 30 to 32 schematically illustrate a rotary actuator 326 which is an alternative embodiment of the rotary actuator 26. The rotary actuator 326 is contemplated to be used together with the hydraulic unit 300. However, the rotary actuator 326 could also be used with the hydraulic units 100 and 200.

The rotary actuator 326 includes a cylindrical main body 358, a central shaft 378 disposed inside the main body 358 and protruding from the ends thereof, and a piston 380 surrounding the central shaft 378 and disposed inside the main body 358. The main body 358 has two ends 382, 384. A variable volume actuator chamber 386 is defined in the main body 358 between the end 382 and the piston 380. Another variable volume actuator chamber 388 is defined in the main body 358 between the end 384 and the piston 380. The central shaft 378 is coaxial with the tilt/trim axis 24. Splined disks (not shown, but similar to the splined disks 60 of FIG. 9) are provided over the portions of the central shaft that protrude from the main body 358. The splined disks are connected to the central shaft so as to be rotationally fixed relative to the central shaft 378. The stern bracket 52 has splined openings at the upper end thereof that receive the splined disks therein. As a result, the stern bracket 52, the splined disks and the central shaft 378 are all rotationally fixed relative to each other. Anchoring end portions 62 are fastened to the sides of the stern bracket 52 over the splined openings thereof and the ends of the central shaft 378 as in the embodiment shown in FIGS. 1 to 9, thus preventing lateral displacement of the swivel bracket 50 relative to the stern bracket 52.

The piston 380 is engaged to the central shaft 378 via oblique spline teeth (not shown) on the central shaft 378 and matching splines (not shown) on the inside diameter of the piston. The piston 380 is slidably engaged to the inside wall of the cylindrical main body 358 via longitudinal splined teeth (not shown) on the outer diameter of the piston 380 and matching splines (not shown) on the inside diameter of the main body 358. By applying pressure on the piston, by supplying hydraulic fluid inside the main body 358 on one side of the piston 380, the piston 380 slides along the central shaft 378. Since the central shaft 378 is rotationally fixed relative to the stern bracket 52, the oblique spline teeth cause the piston 380, and therefore the main body 358 (due to the longitudinal spline teeth), to pivot about the central shaft 378 and the tilt/trim axis 24. The connection between the main body 358 and the swivel bracket 50 causes the swivel bracket 50 to pivot about the tilt/trim axis 24 together with the main body 358.

An actuator passage 390 is defined in the main body 358 between the piston 380 and the end 382. The actuator passage 390 fluidly communicates the actuator chamber 386 with the aperture 122 of the valve assembly 338. Supplying hydraulic fluid to the actuator chamber 386 causes the piston 380 to move toward the end 384 and the swivel bracket 50 to pivot away from the stern bracket 52 (i.e. tilt up). An actuator passage 392 is defined in the main body 358 between the piston 380 and the end 384. The actuator passage 392 fluidly communicates the actuator chamber 388 with the aperture 136 of the valve assembly 338. Supplying hydraulic fluid to the actuator chamber 388 causes the piston 380 to move toward the end 382 and the swivel bracket 50 to pivot toward the stern bracket 52 (i.e. tilt down). An actuator passage 394 is defined in the main body 358 between the actuator passages 390, 392. As can be seen, the actuator passage 394 is disposed closer to the actuator passage 392 than to the actuator passage 390.

When the piston 380 is positioned anywhere in a range of positions corresponding to piston positions between the actuator passages 394 and the end 382, the actuator passage 394 fluidly connects the aperture 136 of the valve unit 308 with the actuator chamber 388. FIG. 30 shows the piston 380 in one such position. When the piston 380 is positioned anywhere in a range of positions corresponding to piston positions between the actuator passages 394 and the end 384, the actuator passage 394 fluidly connects the aperture 136 with the actuator chamber 386. FIG. 31 shows the piston 380 in one such position.

When the pump 102 is operated to supply hydraulic fluid to the aperture 144 of the valve assembly 338 (as shown in FIG. 27), hydraulic fluid is supplied to the actuator chamber 386 via the actuator passage 390. This causes the piston 380 to move towards the end 384 as described above. The piston 380 eventually reaches its position that is closest to the end 384 and shown in FIG. 31 (i.e. full tilt up position of the swivel bracket 50). With the piston 380 having reached the end of its travel and the actuator passage 394 now opening into the actuator chamber 386, any fluid pumped into the actuator chamber 386 through the actuator passage 390 will displace an equal volume of fluid out through the actuator passage 394 and on to the reservoir 310. By operating the pump 102 long enough, it is therefore possible to return most of the hydraulic fluid in the hydraulic circuit to the fluid reservoir 310 to have any air trapped therein separated from the hydraulic fluid and replacing it with substantially air free hydraulic fluid.

When the piston is in a position between the actuator passage 394 and the end 384 (as in FIG. 31), the drive unit 12 is in its uppermost tilt position. When operation of the pump 102 is interrupted and the drive unit 12 is in this position, the weight of the drive unit 12 on the swivel bracket 50 forces the piston 380 toward the end 382. As explained above, when operation of the pump 102 is interrupted, the valve assembly 338 returns to the position illustrated in FIG. 25, therefore hydraulic fluid cannot flow through the valve assembly 338. But the weight of the drive unit 12 will nonetheless move the piston 380 towards the end 382 until it is in alignment with the actuator passage 394 and closes the actuator passage 394, as shown in FIG. 32.

When the pump 102 is operated to supply hydraulic fluid to the aperture 142 of the valve assembly 338 (as shown in FIG. 26), hydraulic fluid is supplied to the actuator chamber 388 via the actuator passage 392. This fluid will also be pumped towards the actuator passage 394, but because the piston 380 is blocking the actuator passage 394 when the pump 102 is activated, no fluid will be able to pass therethrough. The fluid entering the actuator chamber 388 via the actuator passage 392 causes the piston 380 to move towards the end 382 as described above. The piston 380 eventually reaches its position that is closest to the end 382 (i.e. full tilt down position of the swivel bracket 50).

It is contemplated that a valve 396 could be disposed in the actuator passage 394. This valve 396 could be a check valve that allows fluid to flow out of the actuator chamber 388 but not into the actuator chamber 388. With such a check valve 396, the piston 380 does not need to be physically blocking the actuator passage 394 when the pump 102 begins pumping hydraulic fluid towards the aperture 142 of the valve assembly (as shown in FIG. 26) to close the actuator passage 394.

It is also contemplated that the actuator passage 394 could not be connected not to the aperture 136 of the valve unit 308, but rather directly to the reservoir 310. In such an embodiment, the valve 396 is a pressure sensitive valve that permits or prevents flow of hydraulic fluid between the fluid reservoir 310 and the actuator chambers 386 and 388 depending on the hydraulic pressure inside the chamber to which it is connected.

In such an embodiment, when the pump 102 is operated to supply hydraulic fluid to the aperture 144 of the valve assembly 338 (as shown in FIG. 27), hydraulic fluid is supplied to the actuator chamber 386 via the actuator passage 390. This causes the piston 380 to move towards the end 384 as described above. The piston 380 eventually reaches its position that is closest to the end 384 and shown in FIG. 31 (i.e. full tilt up position of the swivel bracket 50). By continuing to operate the pump 102, since the piston 102 cannot move any further, pressure inside the actuator chamber 386 builds up causing the check valve 396 to open thereby causing hydraulic fluid to flow to the fluid reservoir 310 via the actuator passage 394. By operating the pump 102 long enough, it is therefore possible to return most of the hydraulic fluid in the hydraulic circuit to the fluid reservoir 310 to have any air trapped therein separated from the hydraulic fluid and replacing it with substantially air free hydraulic fluid.

When the piston is in a position between the actuator passage 394 and the end 384 (as in FIG. 31), the drive unit 12 is in its uppermost tilt position. When operation of the pump 102 is interrupted and the drive unit 12 is in this position, the weight of the drive unit 12 on the swivel bracket 50 forces the piston 380 toward the end 382. As explained above, when operation of the pump 102 is interrupted, the valve assembly 338 returns to the position illustrated in FIG. 25, therefore hydraulic fluid cannot exit the actuator chamber 386 via the actuator passage 390. This causes pressure to build up inside the actuator chamber 386, which in turn causes the check valve 396 to open. As a result, hydraulic fluid exits the actuator chamber 386 via the actuator passage 390, the piston 380 moves toward the end 382 and the swivel bracket 50 tilts down accordingly. The piston 380 continues to move toward the end 382 and the swivel bracket 50 continues to tilt down until the piston 380 is in alignment with the actuator passage 394 and closes the actuator passage 394, as shown in FIG. 32. Since hydraulic fluid can no longer exit the actuator chamber 386, the piston 380 and the swivel bracket 50 remain in position until the pump 102 is operated again.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A hydraulic system for a marine engine comprising:
   a fluid reservoir for containing hydraulic fluid;
   a bi-directional pump fluidly connected to the fluid reservoir;
   a valve assembly fluidly connected to the pump and the fluid reservoir; and
   a hydraulic actuator fluidly connected to the valve assembly, the hydraulic actuator selectively fluidly communicating with the pump and the fluid reservoir via the valve assembly, the hydraulic actuator being adapted for moving an engine of the marine engine about one of a tilt/trim axis and a steering axis,
   the valve assembly including:
      a first aperture fluidly communicating with the pump;
      a second aperture fluidly communicating with the actuator;
      a third aperture fluidly communicating with the actuator;
      a fourth aperture fluidly communicating with the pump; and
      a fifth aperture fluidly communicating with the fluid reservoir;
   operating the pump to supply hydraulic fluid to the first aperture causing hydraulic fluid to flow from the pump to the actuator via the first and second apertures and from the actuator to the fluid reservoir via the third and fifth apertures, and causing the actuator to move in a first actuator direction, wherein operating the pump to supply hydraulic fluid to the first aperture prevents hydraulic fluid flow between the valve assembly and the pump via the fourth aperture; and
   operating the pump to supply hydraulic fluid to the fourth aperture causing hydraulic fluid to flow from the pump to the actuator via the fourth and third apertures and from the actuator to the pump via the second and first apertures, and causing the actuator to move in a second actuator direction opposite the first actuator direction, wherein operating the pump to supply hydraulic fluid to the fourth aperture prevents hydraulic fluid flow between the valve assembly and the fluid reservoir via the fifth aperture.

2. The hydraulic system of claim 1, wherein interrupting operation of the pump causes the valve assembly to prevent fluid communication between the actuator and the pump and between the actuator and the fluid reservoir.

3. The hydraulic system of claim 1, wherein operating the pump to supply hydraulic fluid to the first aperture causes the pump to draw hydraulic fluid from the fluid reservoir and to supply the hydraulic fluid to the first aperture; and
   wherein operating the pump to supply hydraulic fluid to the fourth aperture causes the pump to draw hydraulic fluid from the actuator via the second and first apertures and to supply this hydraulic fluid to the fourth aperture.

4. The hydraulic system of claim 1, wherein the valve assembly is a shuttle type spool valve.

5. The hydraulic system of claim 4, wherein the valve assembly further includes:
   a body, the first, second, third, fourth and fifth apertures being defined in the body;
   a first valve port, the first aperture fluidly communicating with the second aperture via the first valve port;
   a first valve body normally biased to close the first valve port;
   a second valve port, the third aperture fluidly communicating with the fourth aperture via the second valve port;
   a second valve body normally biased to close the second valve port;
   a shuttle disposed in the body of the valve assembly between the first and second valve ports, the shuttle defining a passage selectively fluidly communicating with the fifth aperture;
   a first variable volume chamber defined in the body of the valve assembly between the shuttle and the first valve port; and
   a second variable volume chamber defined in the body of the valve assembly between the shuttle and the second valve port.

6. The hydraulic system of claim 5, wherein:
   operating the pump to supply hydraulic fluid to the first aperture:
      moves the first valve body to open the first valve port;
      causes hydraulic fluid to flow sequentially from the pump to the first aperture, the first variable volume chamber, the first valve port, the second aperture and in the actuator;
      causes hydraulic fluid in the first variable volume chamber to push the shuttle against the second valve body to open the second valve port, to close the fourth aperture and to fluidly communicate the passage of the shuttle with the fifth aperture; and
      causes hydraulic fluid to flow sequentially from the actuator to the third aperture, the second valve port, the passage in the shuttle, the fifth aperture and the fluid reservoir;
   operating the pump to supply hydraulic fluid to the fourth aperture:
      moves the second valve body to open the second valve port;
      causes hydraulic fluid to flow sequentially from the pump to the fourth aperture, the second variable volume chamber, the second valve port, the third aperture and in the actuator;

causes hydraulic fluid in the second variable volume chamber to push the shuttle against the first valve body to open the first valve port, and to close the fifth aperture to prevent fluid communication between the passage of the shuttle and the fifth aperture; and causes hydraulic fluid to flow sequentially from the actuator to the second aperture, the first valve port, the first variable volume chamber, the first aperture and the pump.

7. The hydraulic system of claim 1, wherein the hydraulic actuator is a rotary actuator, the rotary actuator including:
a cylindrical main body having a first end and a second end;
a central shaft disposed inside the main body;
a piston surrounding the central shaft and disposed inside the main body, the piston being slidable along the central shaft, sliding of the piston along the central shaft causing rotation of the central shaft relative to the cylindrical main body;
a first variable volume actuator chamber defined in the main body between the first end and a first side of the piston;
a first actuator passage defined in the main body between the first end and a first side of the piston, the first actuator passage fluidly communicating the first variable volume actuator chamber with the second aperture;
a second variable volume actuator chamber defined in the main body between the second end and a second side of the piston; and
a second actuator passage defined in the main body between the second end and a second side of the piston, the second actuator passage fluidly communicating the second variable volume actuator chamber with the third aperture.

8. The hydraulic system of claim 7, wherein:
the rotary actuator further includes a third actuator passage defined in the main body between the first and second actuator passage, the third actuator passage being disposed closer to the second actuator passage than to the first actuator passage;
the third actuator passage fluidly communicating the second variable volume actuator chamber with the fluid reservoir over a first range of piston positions;
the third actuator passage fluidly communicating the first variable volume chamber with the fluid reservoir over a second range of piston positions;
the second range of piston positions including piston positions disposed between piston positions in the first range of piston positions and the second end; and
the first range of piston positions being a greater range than the second range of piston positions.

9. A marine outboard engine for a watercraft comprising:
a stern bracket for mounting the marine outboard engine to the watercraft;
a swivel bracket pivotally connected to the stern bracket about a generally horizontal tilt/trim axis;
a drive unit pivotally connected to the swivel bracket about a steering axis, the steering axis being generally perpendicular to the tilt/trim axis;
a fluid reservoir for containing hydraulic fluid;
a bi-directional pump fluidly connected to the fluid reservoir;
a valve assembly fluidly connected to the pump and the fluid reservoir; and
a hydraulic actuator operatively connected to at least one of the stern bracket and the swivel bracket for pivoting the drive unit relative to the stern bracket about one of the tilt/trim axis and the steering axis,
the hydraulic actuator being fluidly connected to the valve assembly, the hydraulic actuator selectively fluidly communicating with the pump and the fluid reservoir via the valve assembly,
the valve assembly including:
a first aperture fluidly communicating with the pump;
a second aperture fluidly communicating with the actuator;
a third aperture fluidly communicating with the actuator;
a fourth aperture fluidly communicating with the pump; and
a fifth aperture fluidly communicating with the fluid reservoir;
operating the pump to supply hydraulic fluid to the first aperture causing hydraulic fluid to flow from the pump to the actuator via the first and second apertures and from the actuator to the fluid reservoir via the third and fifth apertures, and causing the actuator to move in a first actuator direction, wherein operating the pump to supply hydraulic fluid to the first aperture prevents hydraulic fluid flow between the valve assembly and the pump via the fourth aperture; and
operating the pump to supply hydraulic fluid to the fourth aperture causing hydraulic fluid to flow from the pump to the actuator via the fourth and third apertures and from the actuator to the pump via the second and first apertures, and causing the actuator to move in a second actuator direction opposite the first actuator direction, wherein operating the pump to supply hydraulic fluid to the fourth aperture prevents hydraulic fluid flow between the valve assembly and the fluid reservoir via the fifth aperture.

10. The outboard engine of claim 9, wherein interrupting operation of the pump causes the valve assembly to prevent fluid communication between the actuator and the pump and between the actuator and the fluid reservoir.

11. The outboard engine of claim 9, wherein operating the pump to supply hydraulic fluid to the first aperture causes the pump to draw hydraulic fluid from the fluid reservoir and to supply the hydraulic fluid to the first aperture; and
wherein operating the pump to supply hydraulic fluid to the fourth aperture causes the pump to draw hydraulic fluid from the actuator via the second and first apertures and to supply this hydraulic fluid to the fourth aperture.

12. The outboard engine of claim 9, wherein the valve assembly is a shuttle type spool valve.

13. The outboard engine of claim 12, wherein the valve assembly further includes:
a body, the first, second, third, fourth and fifth apertures being defined in the body;
a first valve port, the first aperture fluidly communicating with the second aperture via the first valve port;
a first valve body normally biased to close the first valve port;
a second valve port, the third aperture fluidly communicating with the fourth aperture;
a second valve body normally biased to close the second valve port;
a shuttle disposed in the body of the valve assembly between the first and second valve ports, the shuttle defining a passage selectively fluidly communicating with the fifth aperture;
a first variable volume chamber defined in the body of the valve assembly between the shuttle and the first valve port; and a second variable volume chamber defined in the body of the valve assembly between the shuttle and the second valve port.

14. The outboard engine of claim 13, wherein:
operating the pump to supply hydraulic fluid to the first aperture:
moves the first valve body to open the first valve port;
causes hydraulic fluid to flow sequentially from the pump to the first aperture, the first variable volume chamber, the first valve port, the second aperture and in the actuator;
causes hydraulic fluid in the first variable volume chamber to push the shuttle against the second valve body to open the second valve port, to close the fourth aperture and to fluidly communicate the passage of the shuttle with the fifth aperture; and
causes hydraulic fluid to flow sequentially from the actuator to the third aperture, the second valve port, the passage in the shuttle, the fifth aperture and the fluid reservoir;
operating the pump to supply hydraulic fluid to the fourth aperture:
moves the second valve body to open the second valve port;
causes hydraulic fluid to flow sequentially from the pump to the fourth aperture, the second variable volume chamber, the second valve port, the third aperture and in the actuator;
causes hydraulic fluid in the second variable volume chamber to push the shuttle against the first valve body to open the first valve port, and to close the fifth aperture to prevent fluid communication between the passage of the shuttle and the fifth aperture; and
causes hydraulic fluid to flow sequentially from the actuator to the second aperture, the first valve port, the first variable volume chamber, the first aperture and the pump.

15. The outboard engine of claim 9, wherein the hydraulic actuator is a rotary actuator, the rotary actuator including:
a cylindrical main body having a first end and a second end;
a central shaft disposed inside the main body;
a piston surrounding the central shaft and disposed inside the main body, the piston being slidable along the central shaft, sliding of the piston along the central shaft causing rotation of the central shaft relative to the cylindrical main body;
a first variable volume actuator chamber defined in the main body between the first end and a first side of the piston;
a first actuator passage defined in the main body between the first end and a first side of the piston, the first actuator passage fluidly communicating the first variable volume actuator chamber with the second aperture;
a second variable volume actuator chamber defined in the main body between the second end and a second side of the piston; and
a second actuator passage defined in the main body between the second end and a second side of the piston, the second actuator passage fluidly communicating the second variable volume actuator chamber with the third aperture.

16. The outboard engine system of claim 15, wherein:
the rotary actuator further includes a third actuator passage defined in the main body between the first and second actuator passage, the third actuator passage being disposed closer to the second actuator passage than to the first actuator passage;
the third actuator passage fluidly communicating the second variable volume actuator chamber with the fluid reservoir over a first range of piston positions;
the third actuator passage fluidly communicating the first variable volume chamber with the fluid reservoir over a second range of piston positions;
the second range of piston positions including piston positions disposed between piston positions in the first range of piston positions and the second end; and
the first range of piston positions being a greater range than the second range of piston positions.

17. The outboard engine of claim 9, wherein the hydraulic actuator is operatively connected to the stern bracket and the swivel bracket for pivoting the drive unit relative to the stern bracket about the tilt/trim axis; and
wherein the first actuator direction is a tilt up direction and the second actuator direction is a tilt down direction.

* * * * *